(12) United States Patent
Taylor et al.

(10) Patent No.: US 11,073,920 B1
(45) Date of Patent: Jul. 27, 2021

(54) MULTI-TOUCH INPUT SYSTEM

(71) Applicant: Cirque Corporation, Sandy, UT (US)

(72) Inventors: David Taylor, West Jordan, UT (US);
Patrick Sherwood, Salt Lake City, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 17/074,948

(22) Filed: Oct. 20, 2020

(51) Int. Cl.
*G06F 3/0346* (2013.01)
*G06F 3/044* (2006.01)

(52) U.S. Cl.
CPC ............ *G06F 3/0346* (2013.01); *G06F 3/044* (2013.01)

(58) Field of Classification Search
CPC ............................... G06F 3/0346; G06F 3/044
See application file for complete search history.

(56) References Cited

U.S. PATENT DOCUMENTS

| | | | |
|---|---|---|---|
| 6,753,519 B2 | 6/2004 | Gombert | |
| 6,804,012 B2 | 10/2004 | Gombert | |
| 7,026,599 B2 | 4/2006 | Gombert | |
| 7,199,301 B2 | 4/2007 | Prittwitz | |
| 7,215,323 B2 | 5/2007 | Gombert | |
| 7,296,463 B2 | 11/2007 | Gombert | |
| 7,302,350 B2 | 11/2007 | Gombert | |
| 8,035,616 B2 | 10/2011 | Shaw | |
| 8,063,883 B2 | 11/2011 | Senft | |
| 10,514,780 B2 | 12/2019 | Su | |
| 2012/0194457 A1* | 8/2012 | Cannon | G06K 19/067 345/173 |
| 2018/0021673 A1* | 1/2018 | Fogtmann | A63F 13/24 463/37 |

* cited by examiner

*Primary Examiner* — Peter D McLoone

(57) ABSTRACT

A multi-touch input system may include a control device having a body, multiple legs connected to the body; and each of the multiple legs having a distal end and each of the distal ends having an electrically conductive contact surface where each of the electrically conductive contact surfaces are independently movable with respect to each other.

20 Claims, 21 Drawing Sheets

MULTI-TOUCH INPUT SYSTEM

FIELD OF THE DISCLOSURE

This disclosure relates generally to systems and method for generating inputs. In particular, this disclosure relates to systems and methods for generating inputs that are used to control an object.

BACKGROUND

A user often uses multiple inputs to interact with computing devices. As examples, a user may use a keyboard, a trackpad, and a mouse during a single session on a computer. Which inputs the user employs are based on the user's preferences and the specific programs the user is operating. For example, when using a three-dimensional model program, the user often has to use the computer mouse and the keyboard at the same time to control the orientation of the objects that the user manipulates through the program. In cases where the user is merely drafting documents, the user may mainly employ the keyboard, while the trackpad and the computer mouse may be used to scroll through the document or position the curses.

A conventional computer mouse is a control device that is often placed on the same surface as the computer and is either plugged into a universal serial port of the computer or communicates with the computer wirelessly. The computer mouse may include a ball, an optical sensor, or another type of sensor that is located on the mouse's underside. As the mouse is moved in any two-dimensional direction relative to the surface, the cursor in the computer screen moves in a corresponding direction.

An example of an input device is disclosed in U.S. Pat. No. 7,215,323 issued to Bernd Gombert, et al. This reference discloses a 3D input device is used to generate control data for electronic or electrical devices, and has an actuation part, which is designed so that it can be manipulated indirectly or directly by at least one finger or hand of the user, a base plate, with respect to which the actuation part is mounted so that it can be moved, the relative movement between the actuation part and the base plate being evaluated in order to generate the control data, and a display device with a touch screen, the touch screen being integrated into the upper side of the base plate. Alternatively, the touch screen may be integrated into the upper side of the actuation part. The touch screen of the display device is arranged substantially perpendicular to the longitudinal axis of the actuation part.

Another example of an input is disclosed in U.S. Pat. No. 7,296,463 also issued to Bernd Gombert. This reference discloses a measuring apparatus for measuring of positions or movements of two objects relative to one another with a force and/or moment sensor and a conversion spring element, with the force and/or moment sensor being elastically connected with one of the objects at least via the conversion spring element. A force and/or moment sensor with the measuring apparatus. A joystick with the measuring apparatus or the force and/or moment sensor. Both of these references are herein incorporated by reference for all that they disclose.

SUMMARY

In some embodiments, a multi-touch input system may include a control device having a body, multiple legs connected to the body; and each of the multiple legs having a distal end and each of the distal ends having an electrically conductive contact surface where each of the electrically conductive contact surfaces are independently movable with respect to each other.

Each of the multiple legs may be movably connected to an outside perimeter of the body.

Each of the multiple legs may be equidistantly positioned around an outside perimeter of the body.

At least one of the electrically conductive contact surfaces may have a rounded shaped.

The rounded shape may be a spheric section.

The system may include a handle attached to a side of the body, where the side is opposite of the distal ends of the legs where the handle includes an electrically conductive surface that is in electrically communication with each of the electrically conductive contact surfaces.

The multiple legs may include at least three legs.

The body further may include a post extending away from an underside of the body and extending between the multiple legs.

The post may include a post distal end; and the post distal end includes a post electrically conductive contact surface.

The post electrically conductive contact surface may have a rounded shape.

Each of the multiple legs may have a length measured from the body to the distal ends respectively the post includes a length measured from the body to the post distal end where the length of the post is less than each of the lengths of each of the multiple legs.

In some cases, when the control device is pushed downward against a surface such that the post distal end contacts a surface on which the distal ends of the multiple legs contacts, at least one of the multiple legs may change an angle formed with respect to the body.

The system may include a biasing mechanism to return at least one leg to a former angle formed between at least one leg and the body.

In some examples, a multi-touch input system may include a control device having a body, multiple legs connected to the body, each of the multiple legs having a distal end and each of the distal ends having an electrically conductive contact surface where each of the electrically conductive contact surfaces are movable with respect to each other, a capacitance input surface, a processor in communication with the capacitance input surface, memory having programmed instructions configured to cause the processor, when executed, to detect locations of each of the distal ends when the control device is positioned of the capacitance input surface, determine at least one real-time movement characteristic of the control device based at least, in part, on the detected locations, and apply the movement characteristic on a computer generated object in a display.

The programmed instructions may be configured to cause the processor, when executed, to determine an orientation characteristic of the control device based at least in part on the locations of the distal ends and apply the orientation characteristic on the computer generated object.

In some cases, when the control device is pushed downward against the capacitance input surface such that the post distal end contacts the capacitance input surface at least one of the multiple legs may change an angle formed with respect to the body.

The programmed instructions may be configured to cause the processor, when executed, to detect the location of the post distal end when the post distal end is in contact with the capacitance input surface.

In some examples, a multi-touch input system may include a control device having a body, at least three legs connected to the body, each of at least three legs having a distal end and each of the distal ends having an electrically conductive contact surface, and a post extending away from an underside of the body and extending between the multiple legs where each of the electrically conductive contact surfaces are independently movable with respect to the post.

The post may include a post distal end where the post distal end includes an electrically conductive contact surface.

Each of the multiple legs may have a length measured from the body to the distal ends respectively, the post includes a length measured from the body to the post distal end and the post distal end includes a pivot surface where the length of the post is less than each of the lengths of each of the multiple legs and where the electrically conductive contact surfaces of at least three legs are configured to slide with respect to the post distal end when the control device is pivoting on the pivot surface of the post distal end.

In some examples, a method of operating an input system may include detecting multiple locations of distal ends of multiple legs of a control device that is positioned on a capacitance input surface, determining at least one real-time movement characteristic of the control device based at least, in part, on the detected locations, and applying a three-dimensional characteristic to an object based at least in part on the movement characteristic.

The object may be a computer generated object depicted in a display.

The object may be a remote controlled vehicle.

The three-dimensional characteristic may be a speed.

The three-dimensional characteristic may be an angular direction.

The three-dimensional characteristic may be an orientation.

In some cases, the method may include detecting a location of a post of the control device on the capacitance input surface, and changing an elevation of the object based on a change in a rotational position of the control device while the location of the post is being detected.

The three-dimensional characteristic may be a lean angle.

The lean angle may be determined based, at least in part, on first distance between a first location of the multiple locations and a second location of the multiple locations, a second distance between the first location and a third distance of the multiple locations, and a third distance between the second location and the third location.

The lean angle may be determined based, at least in part, on first distance between a post location and a first leg location of the multiple locations, a second distance between the post location and a second leg location of the multiple locations, and a third distance between the post location and a third leg location of the multiple locations.

In some cases, a computer-program product for operating an input system may include a non-transitory computer-readable medium storing instructions executable by a processor to detect multiple locations of distal ends of multiple legs of a control device that is positioned on a capacitance input surface, determine at least one real-time movement characteristic of the control device based at least, in part, on the detected locations, and apply a three-dimensional characteristic to an object based at least in part on the movement characteristic.

The object may be a computer generated object depicted in a display.

The object may be a remote controlled vehicle.

The three-dimensional characteristic may be a speed.

The three-dimensional characteristic may be an angular direction.

The three-dimensional characteristic may be an orientation.

The instructions may be executable by a processor to detect a location of a post of the control device on the capacitance input surface and change an elevation of the object based on a change in a rotational position of the control device while the location of the post is being detected.

The three-dimensional characteristic may be a lean angle.

The lean angle may be determined based, at least in part, on first distance between a first location of the multiple locations and a second location of the multiple locations, a second distance between the first location and a third distance of the multiple locations, and a third distance between the second location and the third location.

The lean angle may be determined based, at least in part, on first distance between a post location and a first leg location of the multiple locations, a second distance between the post location and a second leg location of the multiple locations, and a third distance between the post location and a third leg location of the multiple locations.

In some embodiments, a multi-touch input system may include a control device having a body, multiple legs connected to the body, each of the multiple legs having a distal end and each of the distal ends having an electrically conductive contact surface, a capacitance input surface, a processor in communication with the capacitance input surface, memory having programmed instructions configured to cause the processor, when executed, to determine at least one real-time movement characteristic of the control device based at least, in part, on a change in an angle of at least one of the legs, and apply the movement characteristic on a computer generated object in a display.

The change in the angle of at least one of the legs may include detecting a change in a distance between at least two of the distal ends.

The change in the angle of at least one of the legs may include measuring a change in a length of at least one of the legs.

The change in the angle of at least one of the legs may include measuring a force imposed on at least one of the legs.

Figure 1:
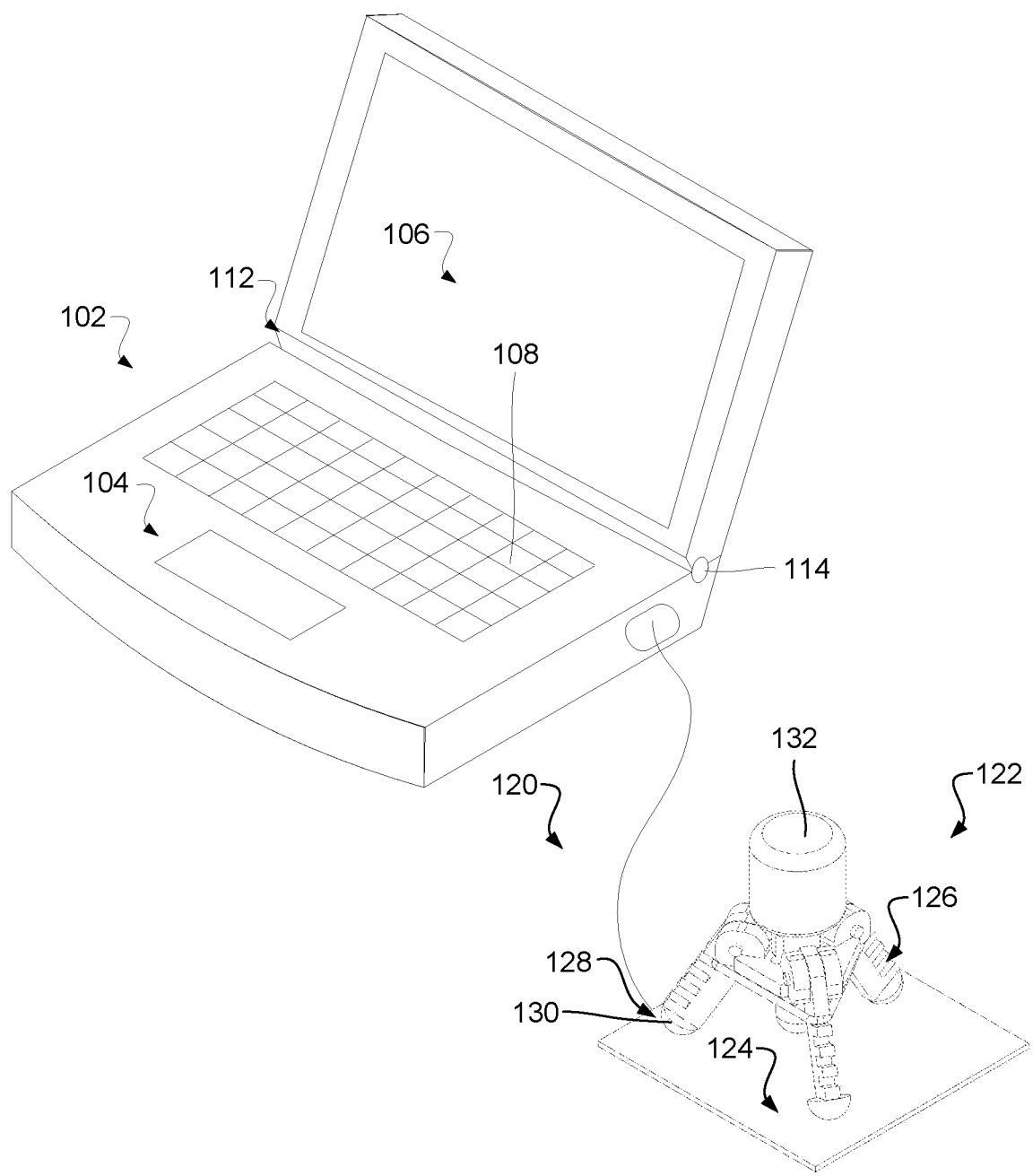
FIG. 1 depicts an example of an electronic device in communication with an input system in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "control device" may generally refer to an input device. In some cases, the control device may be sized to be held in a single hand. Examples of a control device may include a hand-operated device that can be operated in a single hand, a device that may be picked up and held in a palm of a single hand, a device that be operated by a single hand, another type of device sized to be held in a single hand, a device that may share and rest on the same table, desk, or other surface with a computing device, another type of device, or combinations thereof.

It should be understood that use of the terms "touch pad" and "touch sensor" throughout this document may be used interchangeably with "capacitive touch sensor," "capacitive sensor," "capacitive touch and proximity sensor," "proximity sensor," "touch and proximity sensor," "touch panel," "trackpad", "touch pad," and "touch screen."

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

For the purposes of this disclosure, the term "capacitance input surface" may generally refer to components that allow a user to provide commands through touch and/or proximity inputs. The capacitance input surface may include self-capacitance devices, mutual capacitance devices, projected capacitance devices, metal shield capacitance devices, other types of device, or combinations thereof. A non-exhaustive list of capacitance input surfaces may include, but is not limited to, touch pads, touch screens, other types of capacitance input surfaces, or combinations thereof.

For the purposes of this disclosure, the term "touch logic" may generally refer to logic that is in communication with the capacitance input surface that can interpret the measurements coining from the electrodes of the capacitance input surface. In some cases, the interpretation of these measurements are sent to an embedded processor or another subsystem located on a system board of an electronic device, a processor incorporated into the capacitance input surface, a remote device in communication with the capacitance input surface, a networked device, another type of device, or combinations thereof.

FIG. 1 depicts an example of an electronic device 100. In this example, the electronic device is a laptop. However, in other examples, the electronic device may be a desktop, a mobile device, a mobile phone, a display, an electronic screen, a liquid crystal display, an electronic tablet, a projector, another type of electronic device, or combinations thereof.

In the illustrated example, the electronic device 100 includes input devices, such as a keyboard 102 and a touch pad 104. The electronic device 100 also includes a display 106. A program operated by the electronic device 100 may be depicted in the display 106 and controlled by a sequence of instructions that are provided by the user through the keyboard 102 and/or through the touch pad 104.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to add different types of instructions to the programs operating on the electronic device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

A multi-touch input system 120 may also be used to provide input to the electronic device 100. In this example, the multi-touch input system includes a control device 122 and a capacitance input surface 124. In this example, the control device 122 includes multiple legs 126, each with a distal end 128. Each distal end 128 includes an electrically conductive contact surface 130, that when it touches or approaches the capacitance input surface 124, the capacitance input surface 124 can detect the locations of each of the distal ends 128 of the legs 126. In some examples, a handle 132 of the control device 122 is in electrically communication with each of the electrically conductive contact surfaces 130 so that when a user puts his or her hand on the handle 132, the voltage of the user is imposed on each of the electrically conductive contact surfaces 130 providing a voltage differential between the capacitance input surface 124 and each of the electrically conductive contact surfaces 130.

The capacitance input surface 124 may include a capacitance sensor. The capacitance sensor may include a printed circuit board that includes a first layer of electrodes oriented in a first direction and a second layer of electrodes oriented in a second direction that is transverse the first direction. These layers may be spaced apart and/or electrically isolated from each other so that the electrodes on the different layers do not electrically short to each other. Capacitance may be measured at the overlapping intersections between the electrodes on the different layers.

In some examples, electrically conductive objects may be detected by the capacitance input surface 124. For example, as the user's finger or other electrically conductive objects approach the intersections of the first and second sets of electrodes, the capacitance may change at those intersections. These capacitance changes and their associated locations may be quantified to determine where the user is touching or hovering his or her finger within the area of the capacitance input surface 124. In some examples, the first set of electrodes and the second set of electrodes are equidistantly spaced with respect to each other. Thus, in these examples, the sensitivity of the capacitance input surface 124 is the same in both directions. However, in other examples, the distance between the electrodes may be non-uniformly spaced to provide greater sensitivity for movements in certain directions.

In some cases, the display 106 of the electronic device 100 is mechanically separate and movable with respect to the keyboard with a connection mechanism 114. In these examples, the display 106 and keyboard 102 may be connected and movable with respect to one another. The display 106 may be movable within a range of 0 degrees to 180 degrees with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may include a capacitance sensor that is located behind an outside surface of the display 106. As a user's finger or other electrically conductive object approaches the touch sensitive screen, the capacitance sensor may detect a change in capacitance as an input from the user.

Figure 2:
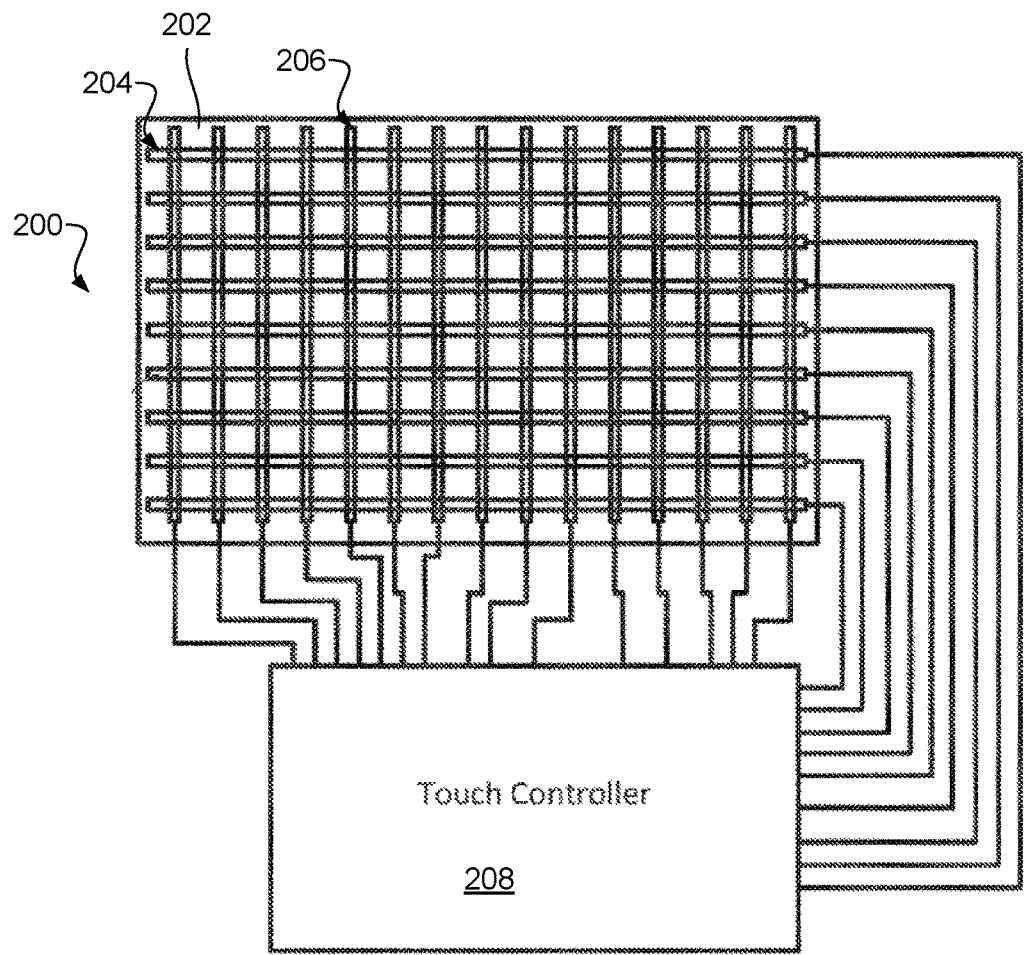
FIG. 2 depicts an example of a substrate with a first set of electrodes and a second set of electrodes in accordance with the disclosure.

FIG. 2 depicts an example of a portion of a capacitance input surface 200. In this example, the capacitance input surface 200 may include a substrate 202, a first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance input surface 200 may include one or more electrodes in the first set 204 or the second set 206.

In some examples, the capacitance input surface 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like). In other examples, the capacitance input surface 200 may be a self-capacitance sensing device.

As shown in FIG. 2, the capacitance input surface 200 is in communication with a touch controller 208. The touch controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the touch controller 208 includes at least one multiplexing circuit to alternate which of the sets 204, 206 of electrodes are operating as drive electrodes and sense electrodes. The driving electrodes can be driven one at a time in sequence, or randomly, or multiple at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A ground plane shield (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a distal end of a leg of a multi-touch control device (or finger, stylus, pointer, or other object) on a surface of the capacitance input surface 200. The capacitance input surface 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance input surface 200, the touch controller 208 may be in a balanced state, and there is no signal on the sense electrode. When a distal end of the control device, finger, or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance input surface 200 having the flexibility of the switching the sets 204, 206 of electrodes between sense and transmit electrodes, in other examples, each set of electrodes is dedicated to either a transmit function or a sense function. In other examples, the capacitance input surface includes a single set of electrodes that use self-capacitance.

Figure 3:
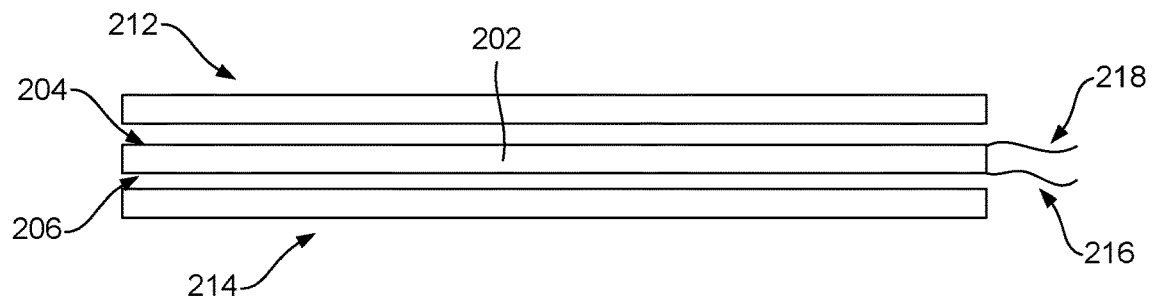
FIG. 3 depicts an example of a capacitance input surface in accordance with the disclosure.

FIG. 3 depicts an example of a substrate 202 with a first set 204 of electrodes and a second set 206 of electrodes deposited on the substrate 202 that is incorporated into a capacitance input surface 200. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 200. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3, the substrate 202 may be located between a touch surface 212 and a shield 214. The touch surface 212 may be a covering that is placed over the first side of the substrate 202 and that is at least partially transparent to electric fields. As a distal end of a control device, finger, or stylus approach the touch surface 212, the presence of these electrically conductive surfaces may change the electric fields on the substrate 202. With the presence of an electrically conductive object, the voltage measured from the sense electrode may be different than when the electrically conductive object is not present. As a result, the change in capacitance may be measured.

The shield 214 may be an electrically conductive layer that shields the electrodes from electric noise. This shield may prevent influence on the electric fields on the substrate 202.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

Figure 4:
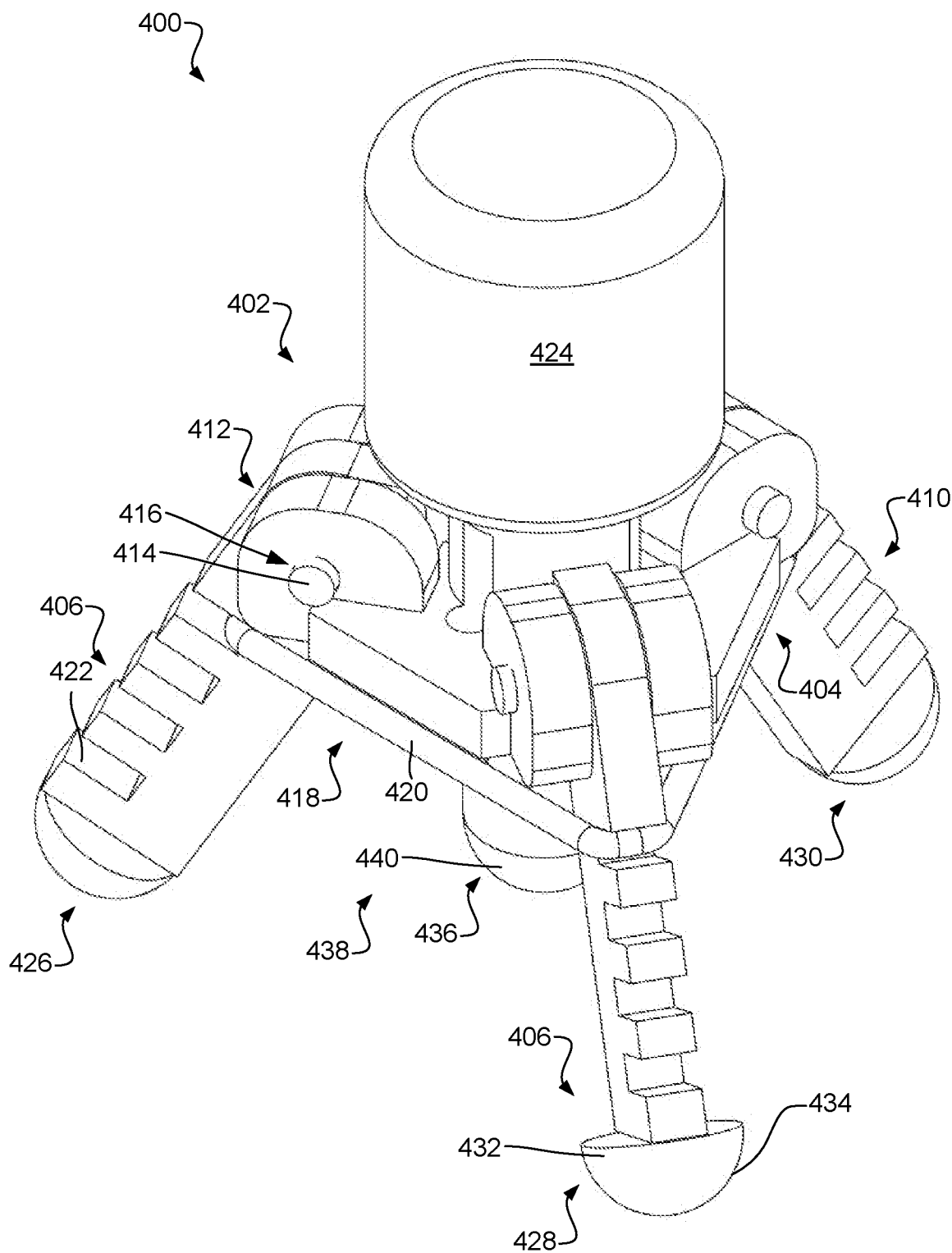
FIG. 4 depicts an example of a control device in accordance with the disclosure.
Figure 5:
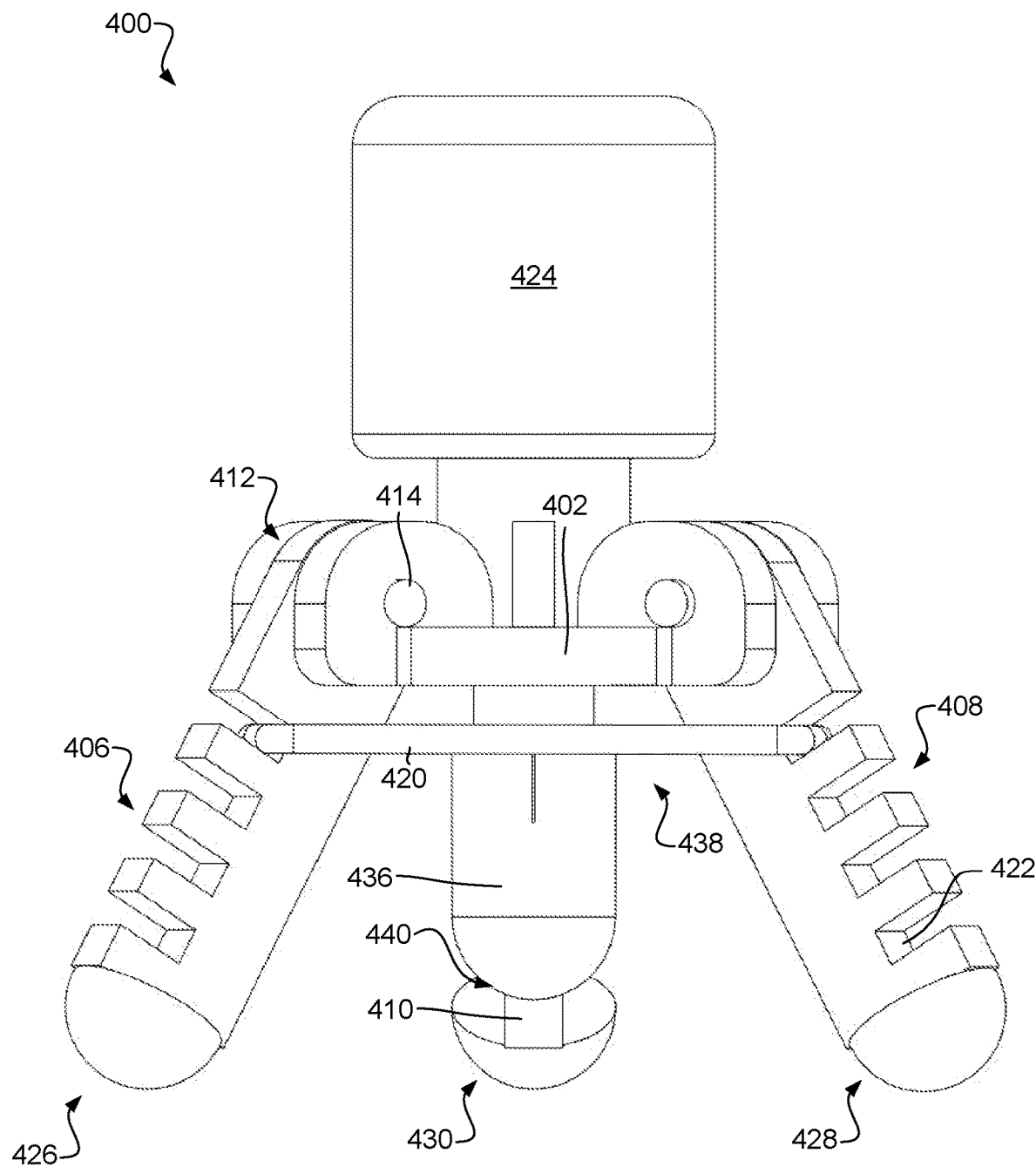
FIG. 5 depicts an example of a control device in accordance with the disclosure.
Figure 6:
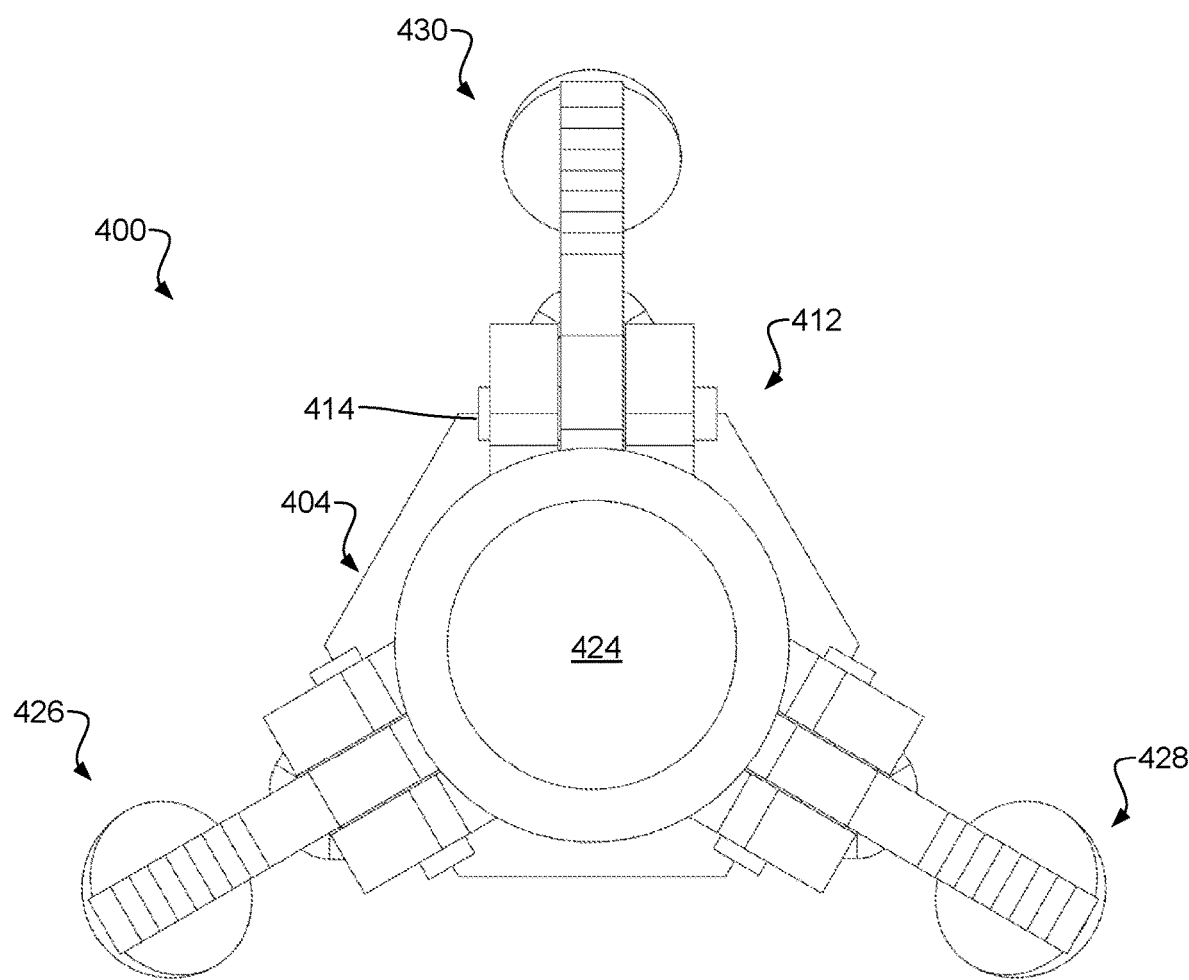
FIG. 6 depicts an example of a control device in accordance with the disclosure.
Figure 7:
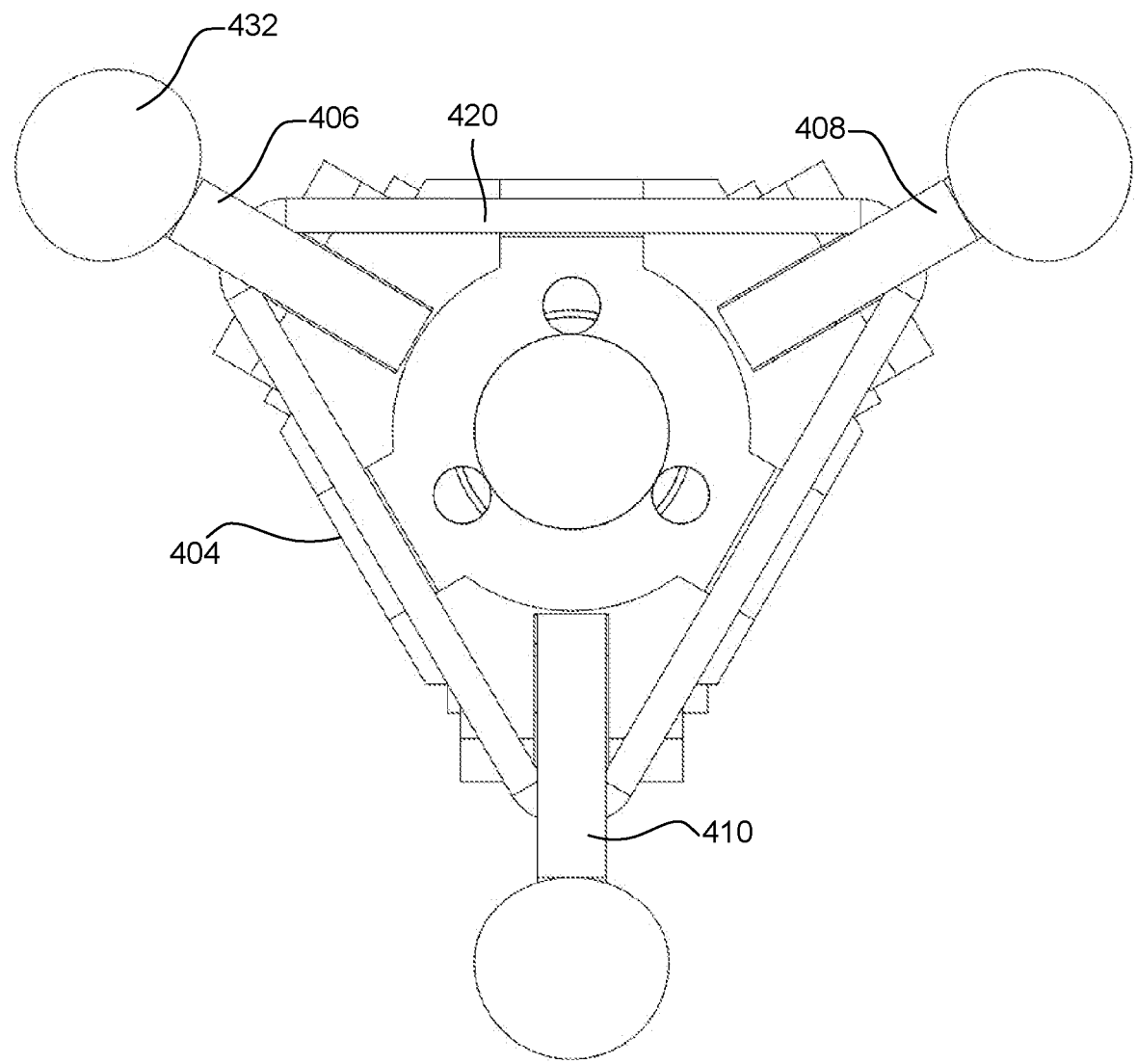
FIG. 7 depicts an example of a control device in accordance with the disclosure.

FIGS. 4-7 depict various views of a control device 400 of the multi-touch input system. FIG. 4 depicts a perspective view, FIG. 5 depicts a side view, FIG. 6 depicts a top view, and FIG. 7 depicts a bottom view.

The control device 400 includes a body 402 having a perimeter 404. In the depicted example, a first leg 406, a second leg 408, and a third leg 410 are attached to the perimeter 404. While this example depicts a control device 400 with three legs attached to the perimeter, any appropriate number of legs may be used in accordance with the principles described herein. For example, the control device may include just two legs, four legs, five legs, more than five legs, or another appropriate number. While this example is depicted with the legs attached to a perimeter of the control device's body 402, the legs may be attached to another portion of the body 402 in accordance with the principles contained herein.

Each of the legs 406, 408, 410 may be angled outwardly from the body 402 so that the control device 400 may balance on the three legs 406, 408, 410. In some examples, the proximal portions of the legs 406, 408, 410 are rigidly fixed to generally keep the legs 406, 408, 410 at an angle that keeps the control device's balance. However, in other examples, the legs 406, 408, 410 are movably connected to the body 402. In examples where the legs are rigidly attached, the legs may have a mechanism to allow the distal ends of the legs to be movable with respect to each other under certain loaded conditions notwithstanding their rigid connection to the body. In those examples where the legs are movably connected to the body, the biasing mechanism or another type of mechanism may be used to restrain free movement of the legs to retain the legs ability to balance notwithstanding the movable connection.

In the depicted views, each of the legs 406, 408, 410 is connected to the body 402 at a pivot joint 412. The pivot joint 412 includes a pivot rod 414 that is inserted through openings 416 in the body 402 and an opening in the proximal portions of the leg (not shown) to connect the legs 406, 408, 410 to the control device's body 402. While this example depicts the legs 406, 408, 410 being attached through a pivot joint 412, in other examples at least one of the legs may be attached through a different mechanism.

The free movement of each of the legs 406, 408, 410 around the pivot rod 414 may be restrained with a biasing mechanism 418. In the depicted example, the biasing mechanism 418 includes an elastomeric band 420 that hooks into slots 422 defined in the legs 406, 408, 410. While each of the legs is depicted with multiple slots, in other examples, each leg includes a just a single slot or another number of slots than is depicted. In yet other examples, a different biasing mechanism is used to restrain the free movement of the legs. For example, pull biasing mechanisms, such as tension springs, may exert a pulling force to position the legs. In other examples, a push biasing mechanism may be used to provide a pushing force to keep the legs at an appropriate angle. In some examples, the biasing mechanism provides a force that urges the distal end of the leg to move towards a central location under the underside of the control device's body 402.

In the depicted example, a handle 424 is connected to the body 402. The handle 424 may be sized to be grasped by a user's hand. In some examples, the handle 424 has a width that is between 75 percent and 25 percent the width of the body. However, in other examples, the handle's width is between 150 percent and 10 percent of the width of the body. In some examples, the length of the handle is between 75 percent and 25 percent of the length of one of the legs. However, in other examples, the handle's length may be between 125 percent and 10 percent of the length of one of the legs. In the depicted example, the handle 424 has a generally cylindrical shape, but other shapes may be used. The handle 424 may be electrically insulated from other portions of the control device 400. In some examples, the handle 424 is made of an electrically conductive material, includes an electrically conductive surface, or is in electrical communication with another electrically conductive portion of the control device 400.

Each of the legs 406, 408, 410 may include a respective distal end 426, 428, 430. Each of the distal ends 426, 428, 430 may have an electrically conductive contact surface 432.

The electrically conductive contact surfaces 432 may be configured to contact the capacitance input surface. The electrically conductive contact surfaces 432 may change the capacitance measured by the electrodes in the capacitance input surface such that touch logic may interpret the inputs from the capacitance input surface to determine the locations of the distal ends 426, 428, 430. The touch logic may also be used to determine the distances between the distal ends 426, 428, 430, changes in distances between the distal ends 426, 428, 430, and movement of each of the distal ends 426, 428, 430 with respect to the capacitance input surface.

The electrically conductive contact surfaces 432 may be a coating of electrically conductive material. In other examples, the entire leg may be made of an electrically conductive material, the entire distal end may be made of an electrically conductive material, or just a portion of the leg and/or portion of the distal end may be made of an electrically conductive material. In some cases, the electrically conductive contact surface is electrically isolated from other portions of the control device. However, in other examples, the electrically conductive contact surfaces 432 are in electrical communication with the handle 424. The electrically conductive contact surfaces 432 may be in communication with the handle 424 through wires. In other cases, at least portions of the leg body and handle are made of electrically conductive materials. In those examples where the handle 424 is in electrical communication with the electrically conductive contact surfaces 432 of the distal ends 426, 428, 430, the voltage of the user may change the voltage on the electrically conductive contact surfaces thereby changing the capacitance on the electrodes in the capacitance input surface. However, in those examples where the user's voltage is not directly applied to the electrically conductive contact surfaces, the inherent electrical characteristics of the electrically conductive contact surfaces may still change the capacitance of the electrodes in the capacitance input surface.

The electrically conductive contact surfaces 432 may include a rounded shape 434. A round shape 434 may allow the electrically conductive contact surfaces 432 to slide, pivot, roll, rotate, or otherwise move against the capacitance input surface. In some cases, the rounded surface is generally a spheric section so that the surface in contact with the capacitance input surface is generally the same contour as a sphere. However, any appropriate rounded shape, even rounded shapes with some flats or other discontinuities, may be used in accordance with the principles described in the present disclosure.

In the depicted example, the control device 400 includes a post 436 protruding outward and away from the underside 438 of the body 402. In some cases, the post 436 is a central post that is centralized with respect to the body and/or with respect to the attachments of the legs to the body. In some cases, the post may be asymmetrically located with respect to the leg attachments and/or the body. The post 436 may also include a post distal end 440. In some examples, the post distal end 440 may also include a rounded shape 434.

In some examples, the post 436 is slidably attached to the body 402. In other examples, the post 436 is rigidly fixed with the body 402. In some cases, a user may exert a downward force on the body 402 through the handle 424 or otherwise so that the post distal end 440 moves downward and comes into contact with the capacitance input surface. As the downward force moves the post 436 downward, the downward force may also cause at least one of the distal ends 426, 428, 430 of the legs 406, 408, 410 to slide across the capacitance input surface such that the moved distal end has a changed distance from at least one of the other distal ends. In some cases, two or more of the distal ends change places. In some cases, the relative movement of the distal end changes the angle formed between the body and the respective leg.

The post distal end 440 may be configured so that the user may change the lean angle of the control device 400 by pivoting the control device 400 about on the post distal end 440. In some cases, the post distal end 440 includes an electrically conductive contact surface. In those examples where the post distal end 440 includes an electrically conductive contact surface, the capacitance input surface can detect the location of the post distal end 440 when the post distal end 440 is in contact with the capacitance input surface. In some examples, the post distal end 440 does not include an electrically conductive contact surface, and in such examples, the capacitance input surface may not detect contact between the capacitance input surface and the post distal end 440. However, regardless whether the capacitance input surface detects contact, the post 436 can stabilize the control device 400 as the user changes the lean angle of the control device 400 against the capacitance input surface. As the lean angle changes, the distal ends 426, 428, 430 of the legs 406, 408, 410 change, and the lean angle can be determined by the positions of the distal ends 426, 428, 430. While some examples use the post 436 to stabilize the control device 400 when changing the lean angle, using the post 436 may not be necessary to change the lean angle. In some cases, the lean angle may be determined based on the position of the distal ends 426, 428, 430 of the legs 406, 408, 410 regardless of whether the post 436 makes contact with the capacitance input surface. In some cases, the control device may not incorporate a post.

In the example depicted in FIGS. 4-7, the control device 400 is oriented at a neutral lean angle. In some examples, a neutral lean angle may orient the control device to be substantially perpendicular with the capacitance input surface. In some examples, a neutral lean angle may orient a post so that the post is substantially perpendicular to the capacitance input surface. In some examples, a neutral lean angle may orient the distal ends of the legs so that each distal end is equidistantly spaced apart from each other.

Figure 8:
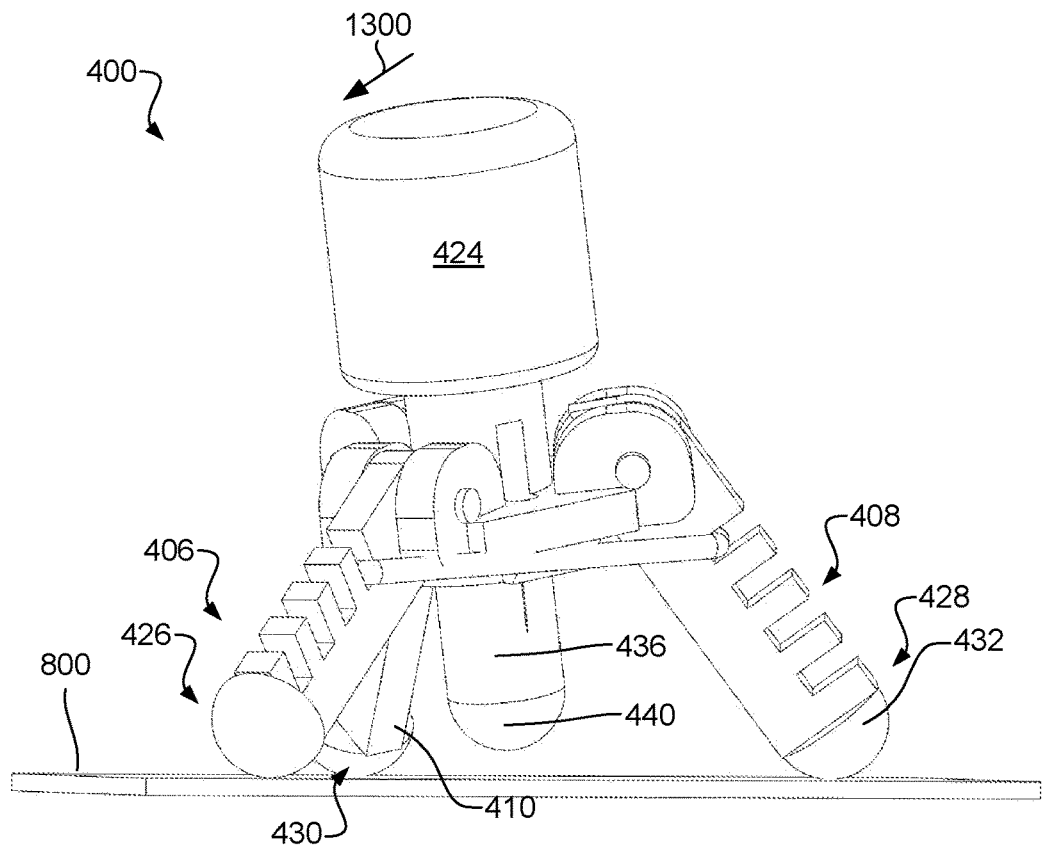
FIG. 8 depicts an example of a control device in accordance with the disclosure.
Figure 9:
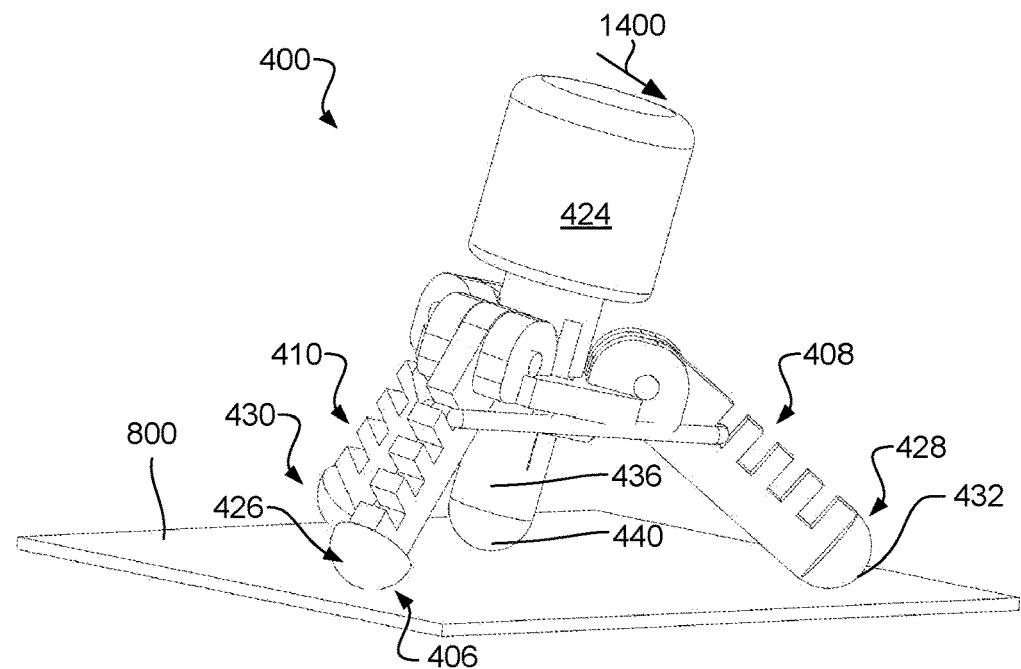
FIG. 9 depicts an example of a control device in accordance with the disclosure.
Figure 10:
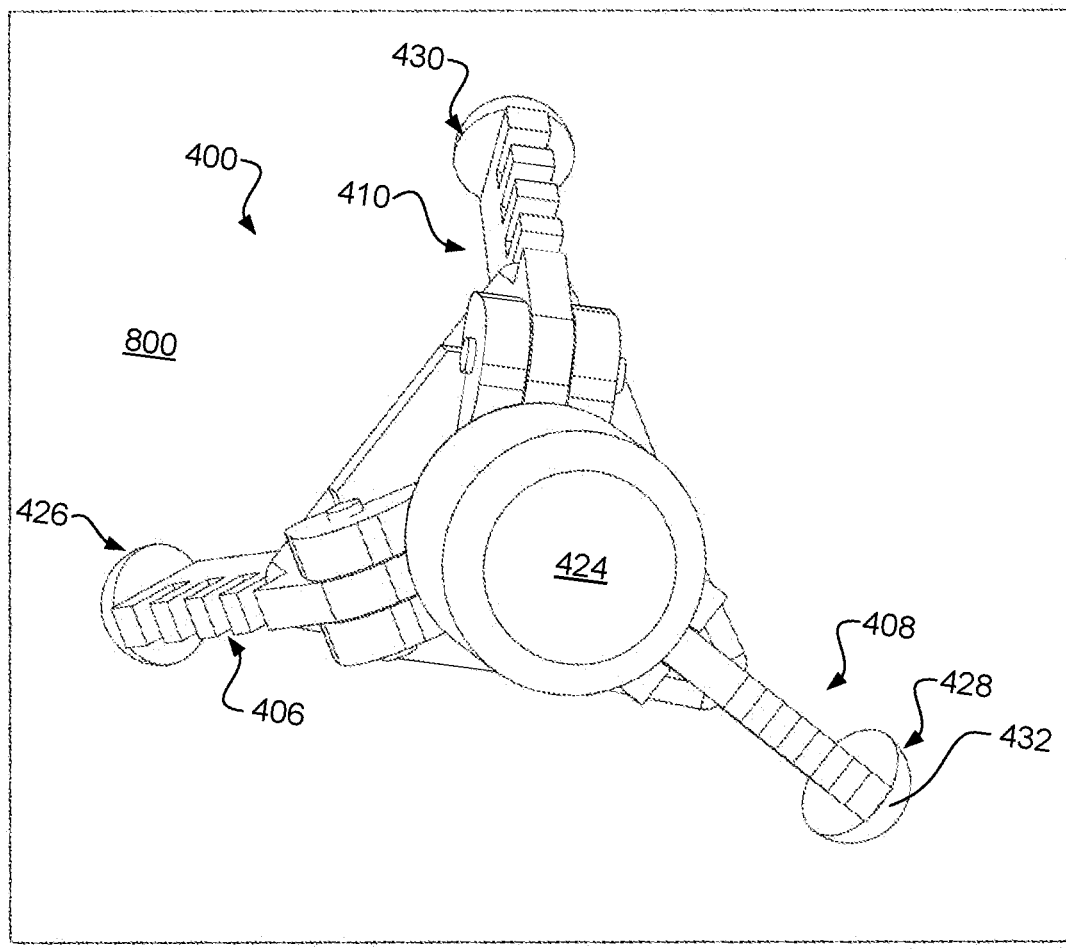
FIG. 10 depicts an example of a control device in accordance with the disclosure.

FIGS. 8-10 depict examples of the control device 400 oriented at non-neutral lean angles. In some examples, a non-neutral lean angle may orient the control device 400 to form an angle with the capacitance input surface 800 between one degree and 80 degrees. In some examples, a non-neutral lean angle may orient a post so that the post 436 forms an angle with the capacitance input surface 800 between one degree and 80 degrees. In some examples, a non-neutral lean angle may orient the distal ends 426, 428, 430 of the legs 406, 408, 410 so the distal ends 426, 428, 430 are not equidistantly spaced apart from each other. As the lean angle changes, the distal ends 426, 428, 430 move across the capacitance input surface 800 changing their locations. The movement and the new locations can be tracked by the touch logic in communication with the capacitance input surface to determine the lean angle.

While the illustrated examples depict the legs equidistantly positioned about the body and the distal ends equidistantly spaced apart from each other when the control device is in a neutral position, in other embodiments, the legs may not be equidistantly attached to the body and/or the legs' distal ends may not be equidistantly spaced when the control device is oriented in a neutral position. In either of these types of examples, the neutral angle can be determined by matching an arrangement of the locations that correspond with the neutral lean angle. The non-neutral lean angles may be determined by deviations from the neutral-lean angle spacing arrangement. In some cases, the arrangement of the locations that correspond with the neutral lean angle are equidistantly spaced distal ends, and in other examples, the arrangement that corresponds with the neutral lean angle includes non-equidistantly spaced distal ends.

In the examples of FIGS. 8-10, the post 436 is not making contact with the capacitance input surface 800. In FIG. 8, the lean angle is depicted towards the left-hand side of the figure, and in FIG. 9, the lean angle is depicted towards the right-hand side of the figure. In these cases, the leg to which the lean angle is directed has a leg with a distal end that has moved the farthest away from its neutral lean angle location. While these examples depict that a single distal end has moved to reflect the tilt angle at which a user may position the control device 400, in some examples, more than one distal end may move. For example, if the user desires to create an input that involves tilting the control device 400 in a direction that leans in a direction that is between two legs, each of the distal ends of the two legs may move in response to the user moving the legs in the desired direction.

Figure 11:
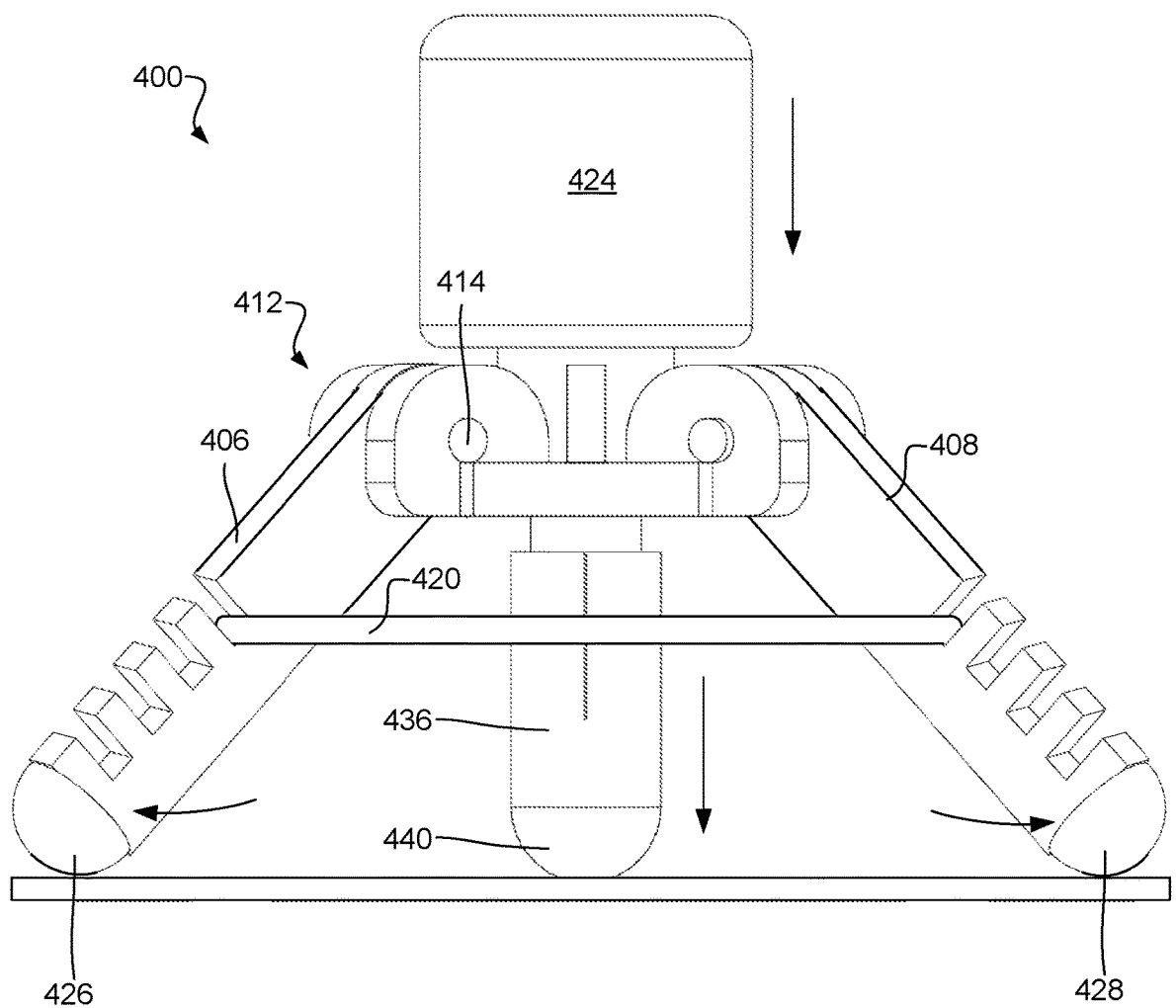
FIG. 11 depicts an example of a control device in accordance with the disclosure.

FIG. 10 depicts an example of the lean angle from a top view. In the example depicted in FIG. 11, the control device 400 is depicted with a downward force so that the post 436 is in contact with the capacitance input surface. In this example, the downward force is straight down resulting in a control device remaining in a neutral lean angle. In this example, each of the distal ends of the legs moved outwardly away from the post and/or body of the control device 400 the same amount resulting the new locations of each of the distal end still being equidistant from each other. In an example where the downward force was angled to the side, the lean angle of the control device 400 may have changed differently resulting in one of the distal ends moving more than the others and orienting the control device in a non-neutral lean angle.

In some examples, the user may change the lean angle after the post 436 is already in contact with the capacitance input surface. In this example, the user may use the post 436 to stabilize the control device 400 by pivoting the control device 400 on the distal end of the post 436.

FIGS. 12-17 depict examples of a capacitance input surface 1200 in communication with a display 1202. The locations 1204, 1206, 1208 of the distal ends of the legs of the control device and their respective distances 1210, 1212, 1214 from each other are represented on the capacitance input surface 1200. A computer-generated object 1216 is depicted in the display 1202. The computer-generated object 1216 may be a three-dimensional object or a two dimensional object.

Figure 12:
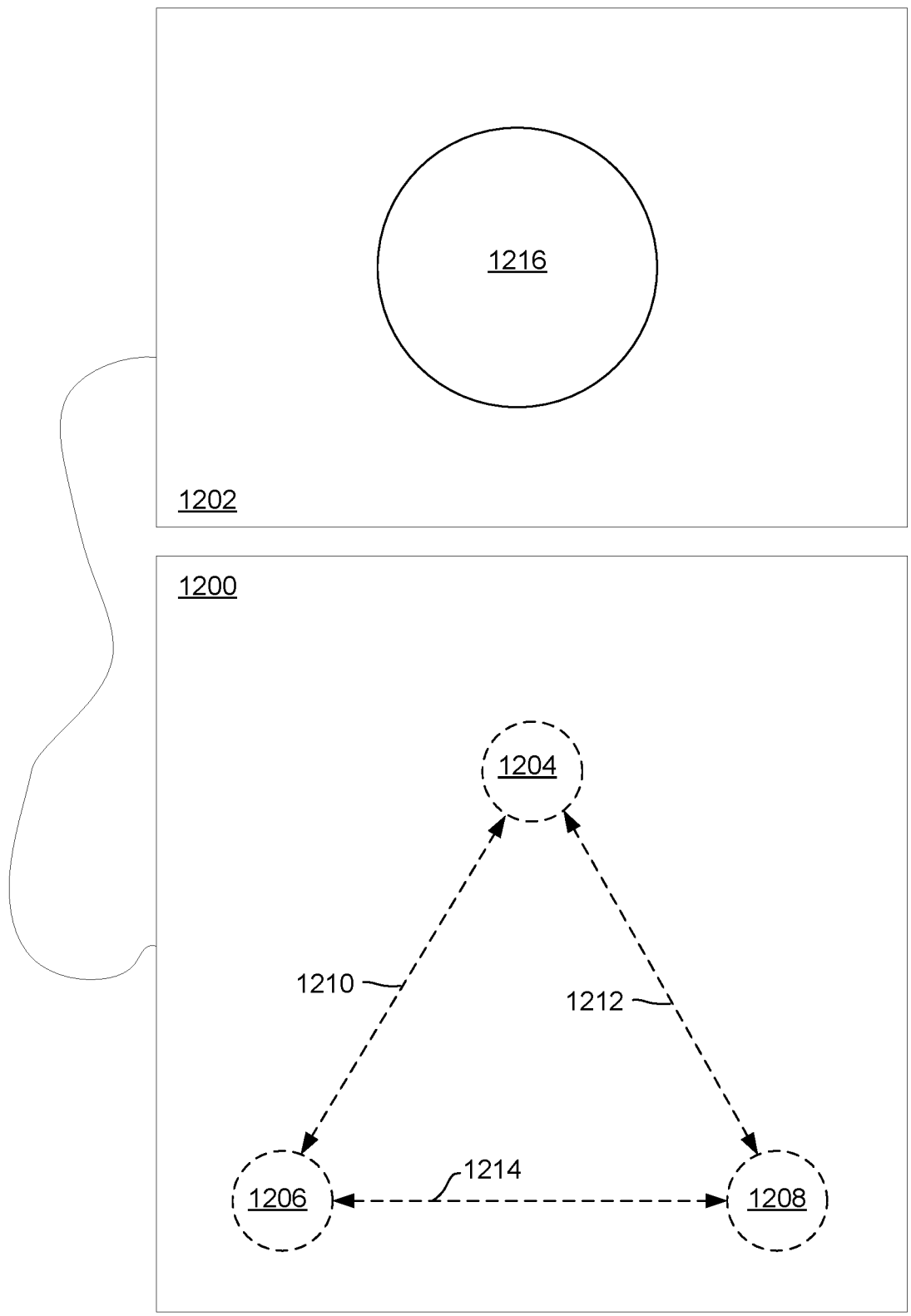
FIG. 12 depicts an example of a capacitance input surface in communication with a display depicting a computer generated object in accordance with the disclosure.

In the example of FIG. 12, the arrangement of the distal ends' locations 1204, 1206, 1208 represent the control device having a neutral lean angle. In this example, the arrangement of locations representing the neutral lean angle includes each of the locations 1204, 1206, 1208 being spaced apart from each other at equal distances. While this example depicts that the neutral lean angle corresponds with all of the locations being spaced apart from each other at equal distances, in other examples, the arrangement of locations corresponding to the neutral lean angle includes at least one of the locations being spaced at a different distance from one of the other locations. In the example of FIG. 12, the computer-generated object 1216 is oriented in a neutral orientation since the locations 1204, 1206, 1208 of the distal ends correspond to the neutral lean angle.

Figure 13:
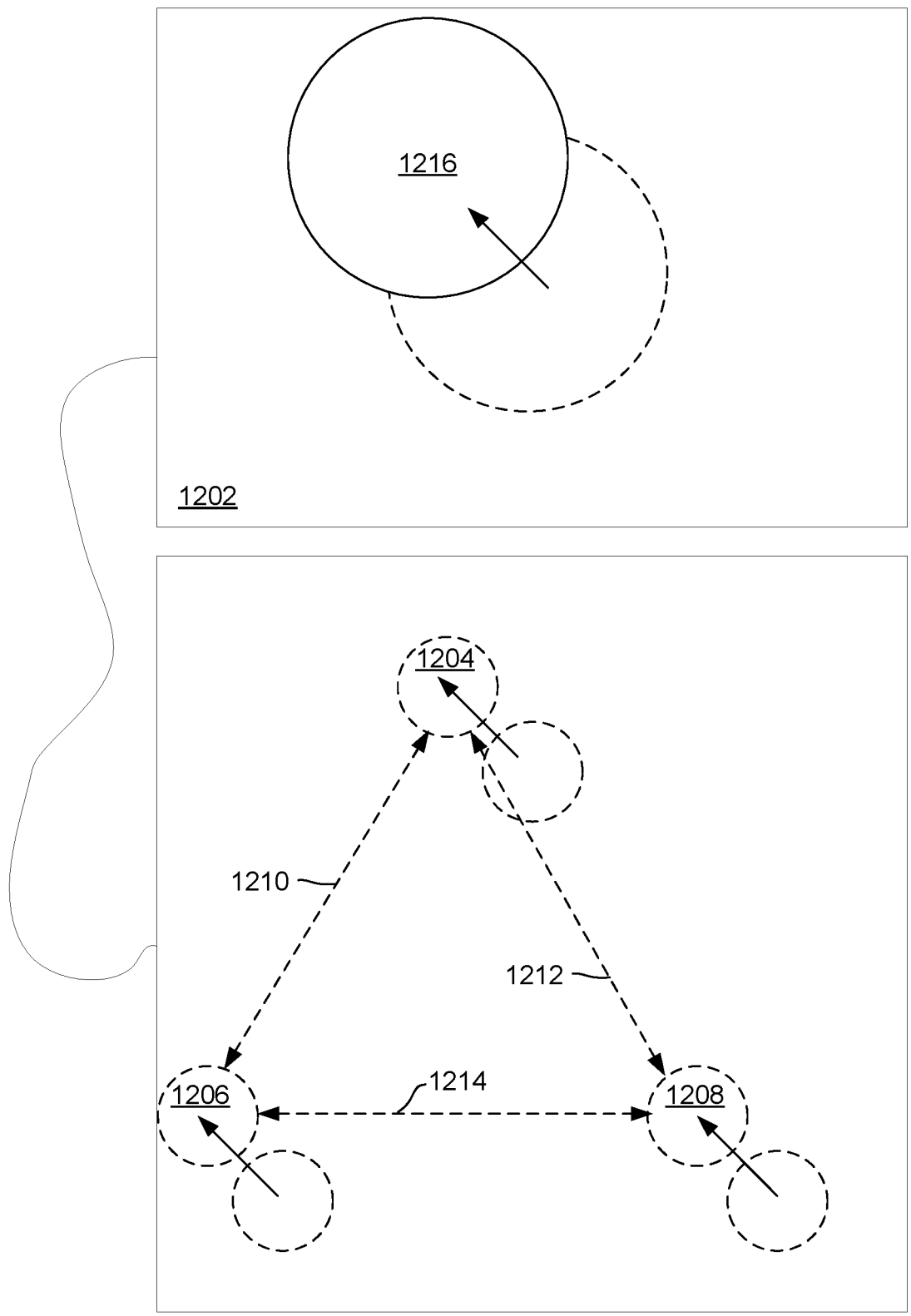
FIG. 13 depicts an example a capacitance input surface in communication with a display depicting a computer generated object in accordance with the disclosure.
Figure 14:
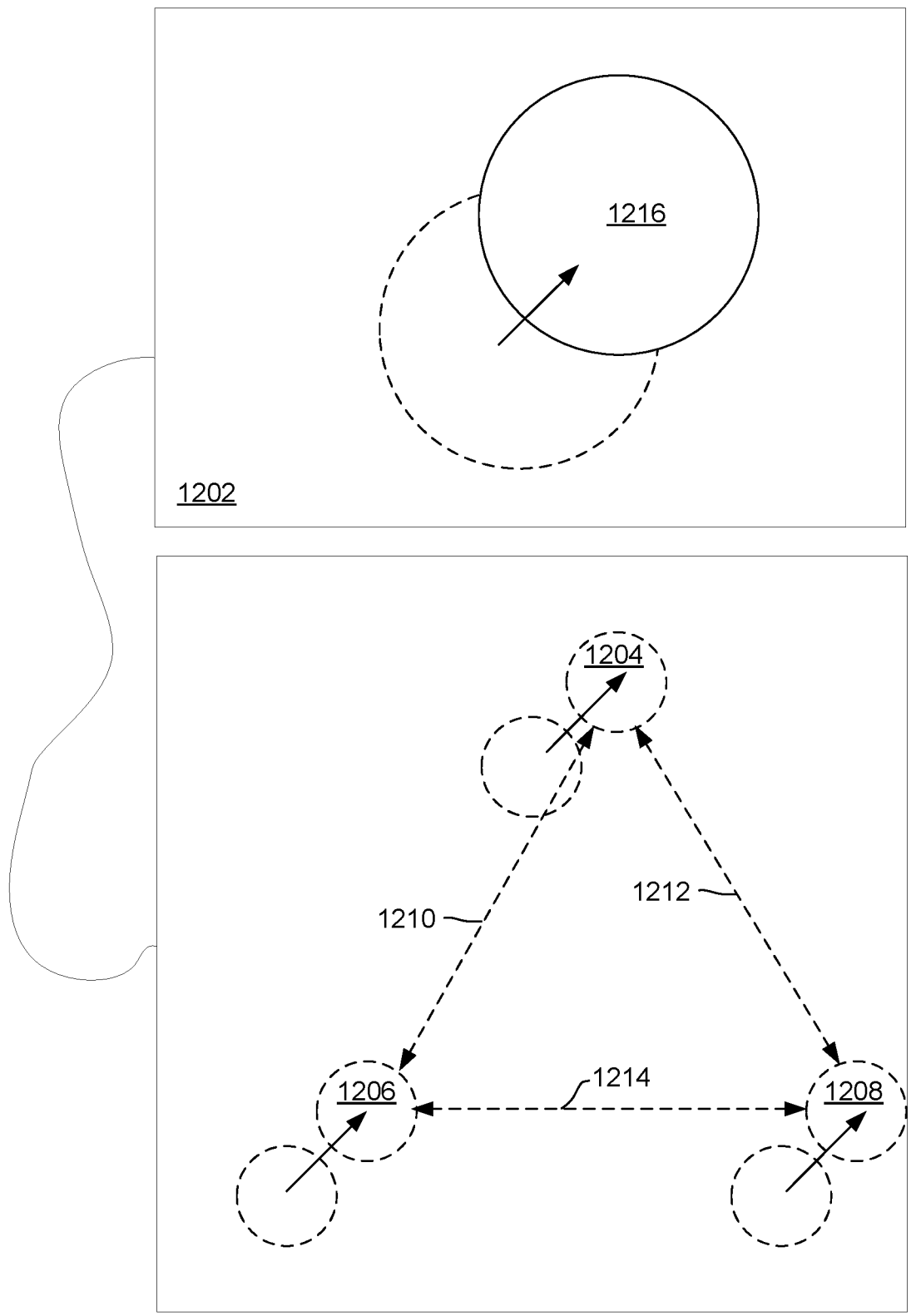
FIG. 14 depicts an example of a capacitance input surface in communication with a display depicting a computer generated object in accordance with the disclosure.

In FIG. 13, each of the locations 1204, 1206, 1208 have moved in the same direction while the distances 1210, 1212, 1214 between the locations 1204, 1206, 1208 have remained the same. This movement is interpreted by the touch logic as a command to move the computer-generated object in the same direction. In this example, since the distances 1210, 1212, 1214 between the locations 1204, 1206, 1208 did not change, but stayed in the same arrangement that corresponds with a specific orientation, the orientation of the computer-generated object 1216 did not change. While example in FIG. 13 is shown moving the locations 1204, 1206, 1208 in a first direction 1300 and thereby moving the computer-generated object 1216 in the first direction 1300, the system may interpret moving the locations in a second direction 1400 to be an input to move the computer-generated object 1216 in the second direction 1400 as depicted in the example of FIG. 14.

Figure 15:
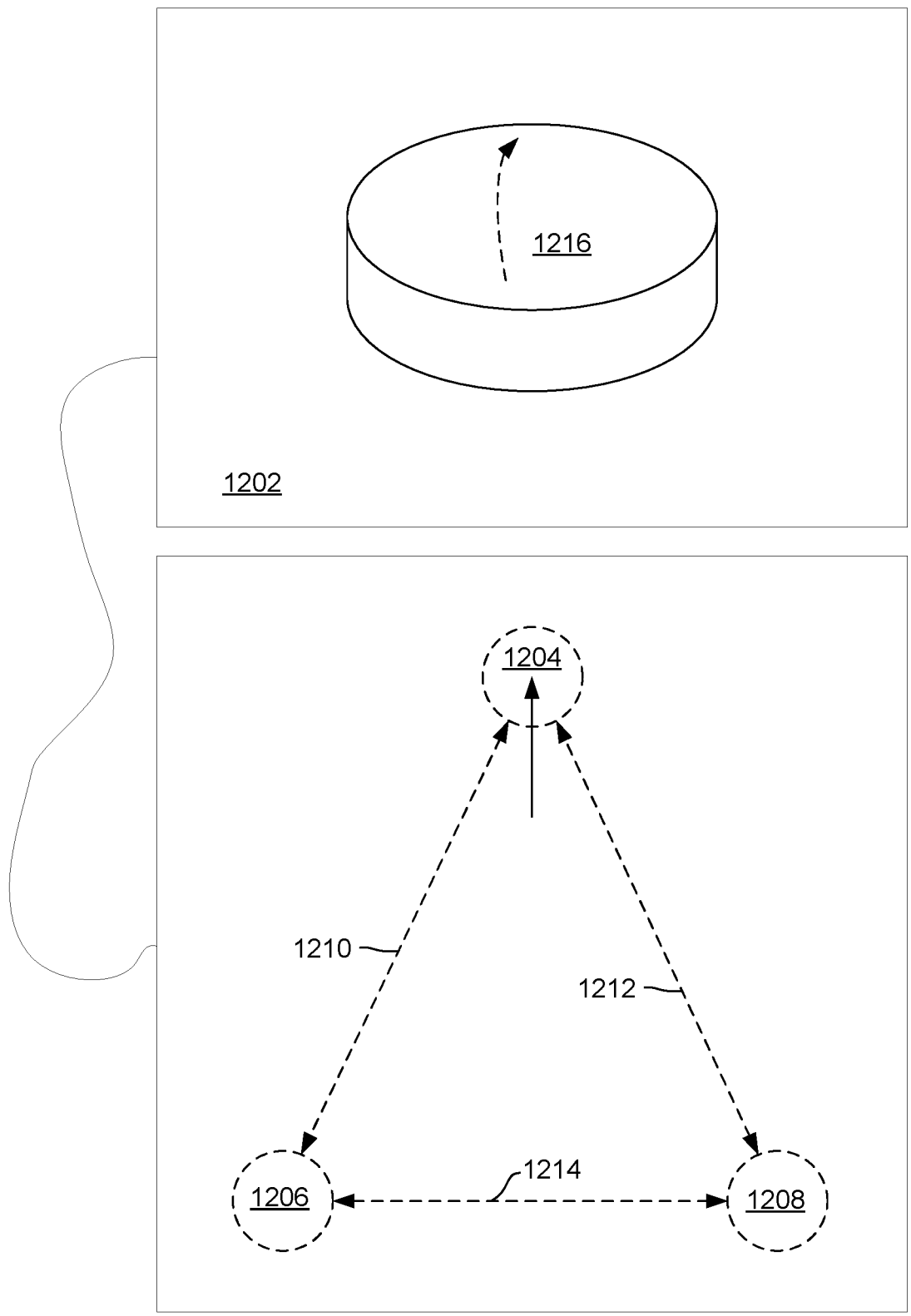
FIG. 15 depicts an example of a capacitance input surface in communication with a display depicting a computer generated object in accordance with the disclosure.

In the example depicted in FIG. 15, just one of the locations 1204 is depicted as having moved with respect to the other two locations 1206, 1208. In this example where the arrangement of locations that corresponds with a neutral lean angle is where each of the locations is equidistantly spaced apart from each other, having a single location move depicts a deviation from the arrangement that corresponds from the neutral lean angle. As a result, the system may interpret that the user has caused the control device to lean in a new orientation. The new orientation of the control device may be calculated from the change in distance between the moved location and the other two locations. The system may orient the computer-generated object 1216 to move to the calculated lean angle of the control device.

Figure 16:
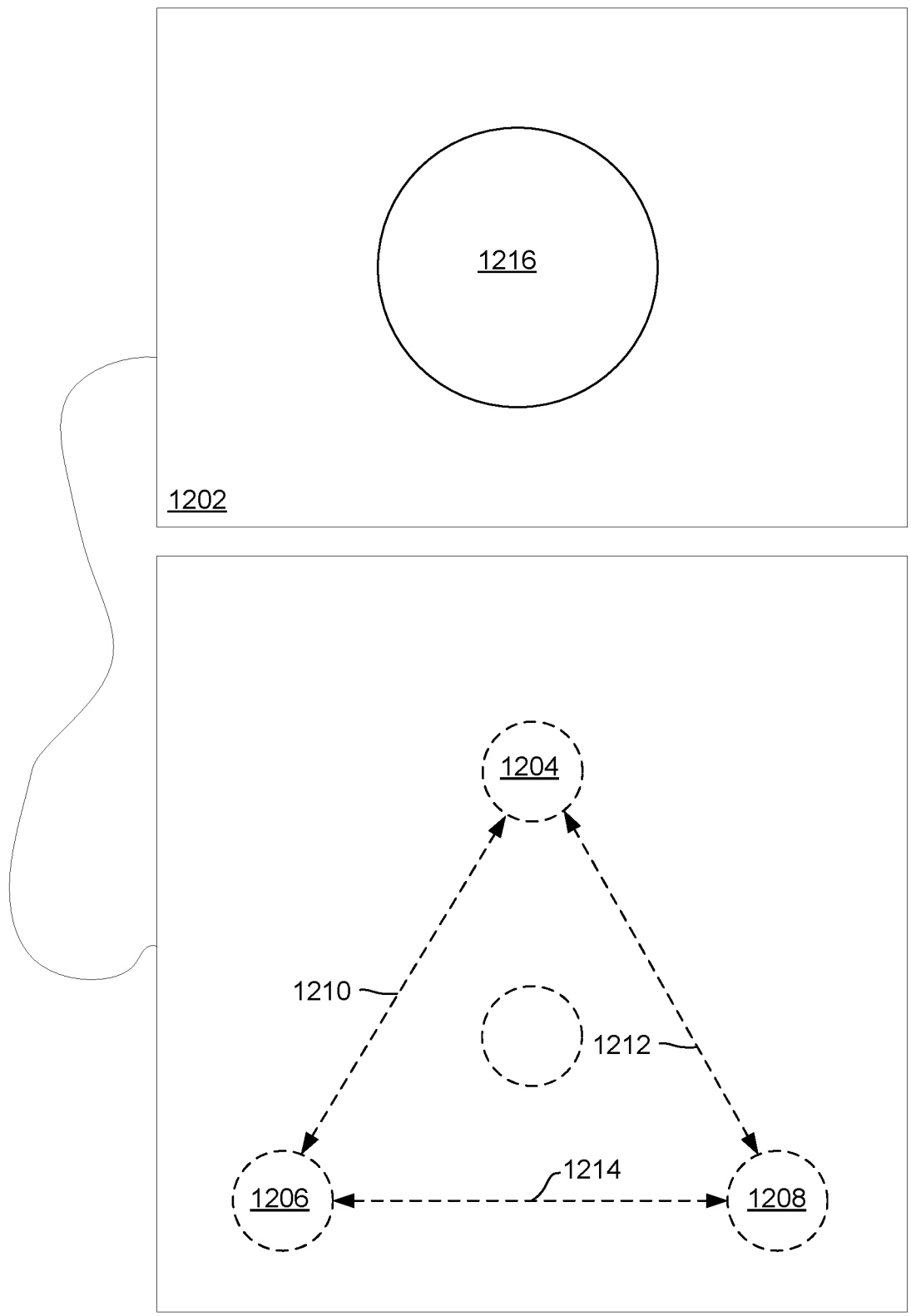
FIG. 16 depicts an example a capacitance input surface in communication with a display depicting a computer generated object in accordance with the disclosure.

FIG. 16 depicts an example of where the capacitance input surface 1200 detects the post location 1600 of the distal end of the post of the control device. In this example, the post location 1600 is in a central location inside an area defined by the locations 1204, 1206, 1208 of the distal ends of the control device's legs. In some cases, the detection of the post location 1600 may occur when the control device is pushed downward so that the distal end of the post makes contact with the capacitance input surface 1200. In this particular example, the detection of the post location 1600 does not alter the orientation or the movement of the computer-generated object. In some examples, the distal end of the post includes an electrically conductive contact surface, which makes detection of the post location easier. In some examples, the distal end of the post may not include an electrically conductive contact surface, and in such examples, the post location may not be detectable or may have to be detected through a different mechanism.

Figure 17:
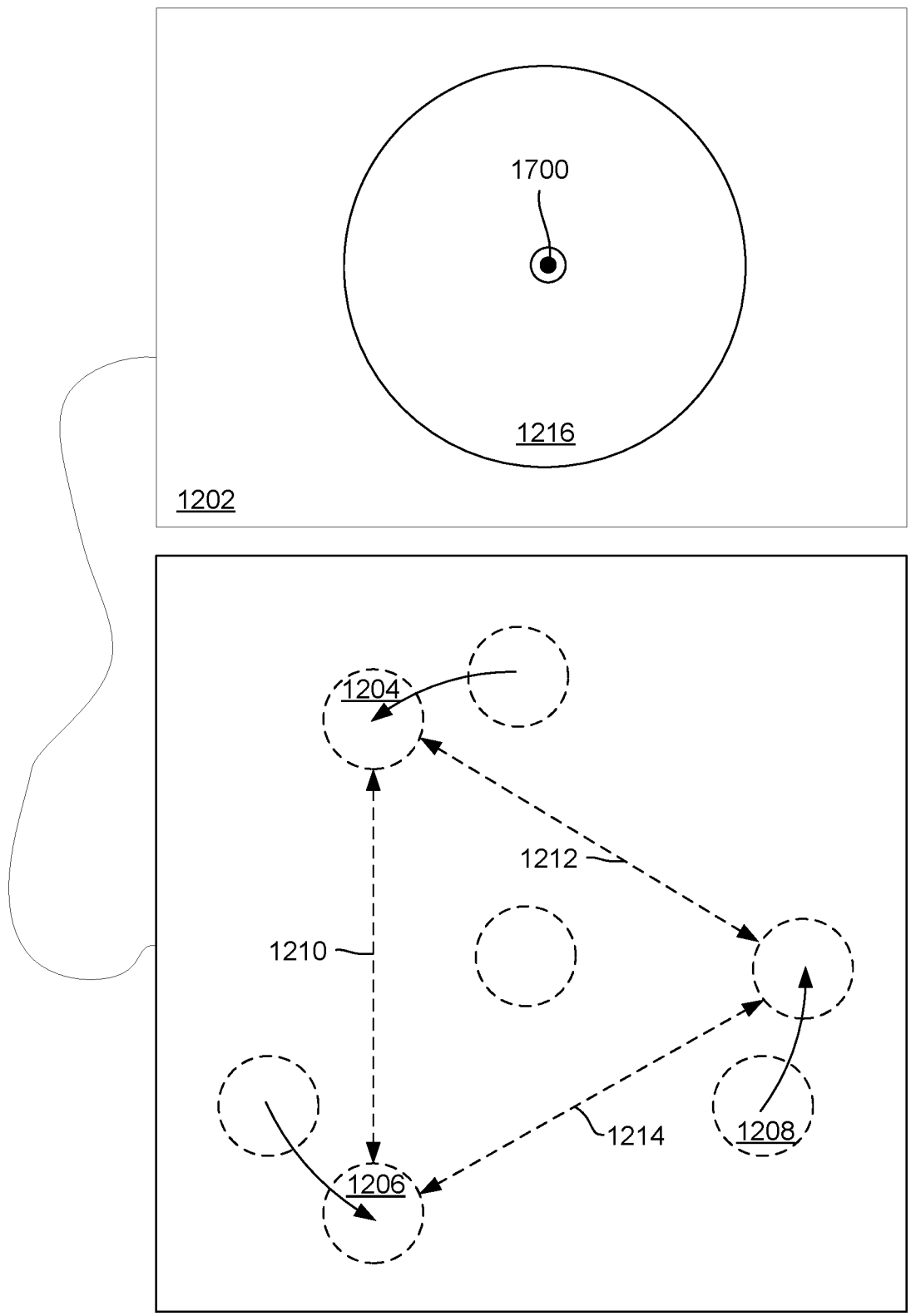
FIG. 17 depicts an example a capacitance input surface in communication with a display depicting a computer generated object in accordance with the disclosure.

FIG. 17 also depicts an example where the post location 1600 is detected. In this example, the system may interpret commands from the control device in a different mode when the post location is detected. In this example, the locations 1204, 1206, 1208 of the legs' distal ends are rotated when the post location 1600 is detected. In the examples of FIGS. 13 and 14, such a movement would have caused the computer-generated object 1216 to rotate where the mode was not changed due to the detected of the post location 1600. However, in the example of FIG. 17 where the mode location is changed due to the detection of the post location, the system may interpret the command differently. In this depicted example, the elevation of the computer-generated object is changed, which is represented by the arrow head 1700 directed off of the page. The rotation of the locations 1204, 1206, 1208 may cause the elevation to change in the other direction.

In some cases, all of the commands from the control device may change when the post location is detected. In other examples, only some of the commands may change. For example, the rotation of the locations 1204, 1206, 1208 may change from rotating the computer-generated object to changing the elevation of the computer-generated object while the changes in the distances 1210, 1212, 1214 between the locations 1204, 1206, 1208 may continue to be used to change the orientation of the computer-generated object. In some examples, detection of the post location 1600 may not change the mode.

Figure 18:
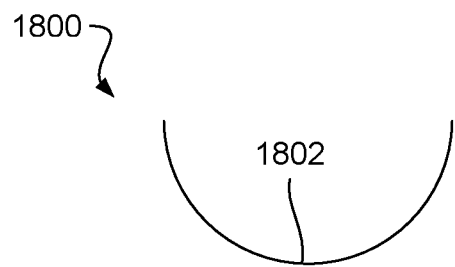
FIG. 18 depicts an example of a spherical distal end in accordance with the disclosure.

FIGS. 18-27 depict examples of shapes of at least one of the legs and/or the post. In the example of FIG. 18, the distal end 1800 is a spheric section 1802 where the profile of the distal end matches the profile of a sphere.

One advantage to having a rounded shape at the distal end is that the electrically conductive contact surface may stay in contact with the capacitance input surface in a wide range of angles. For example, in cases where the legs and posts have a rounded distal end, the distal ends may still have contact with the capacitance input surface at angles formed between the legs and the capacitance input surface between one degree and 179 degrees. However, in some examples, actual contact between the distal ends and the capacitance input surface may not be required for the capacitance input surface to detect the presence of the distal ends. In some cases, the electrodes of the capacitance input surface may be sensitive enough to detect the electrically conductive contact surfaces even when the distal ends are just in proximity of the surface but an air gap separates the electrically conductive contact surface and the capacitance input surface. In some cases, the proximity of the electrically conductive contact surfaces may be detectable less than one millimeter away, less than two millimeters away, less than three millimeters away, less than five millimeters away, less than seven millimeters away, less than ten millimeters away, less than an inch away, less than another appropriate distance away, or combinations thereof.

Figure 19:
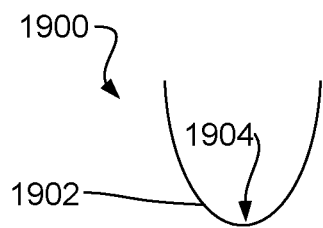
FIG. 19 depicts an example of a rounded distal end in accordance with the disclosure.
Figure 20:
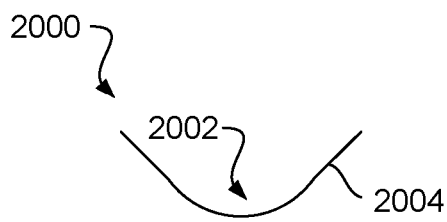
FIG. 20 depicts an example a rounded distal end in accordance with the disclosure.

The distal end 1900 of FIG. 19 includes a curve 1902 that progressively changes its radius of curvature. As the curve progresses towards the apex 1904 of the curve 1902, the radius of curvature gets progressively sharper while as the radius of curvature progresses away from the apex 1904, the radius of curvature progressively gets flatter. The distal end 2000 of FIG. 20 depicts an example where the apex 2002 has a radius of curvature that is supported by a conical section 2004.

Figure 21:
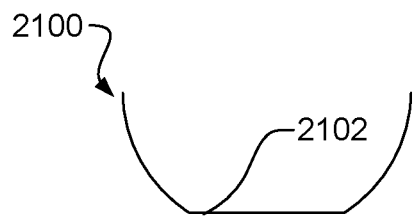
FIG. 21 depicts an example of a distal end with a central flat in accordance with the disclosure.
Figure 22:
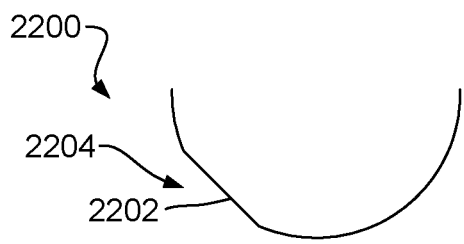
FIG. 22 depicts an example of a distal end with an angled flat in accordance with the disclosure.
Figure 23:
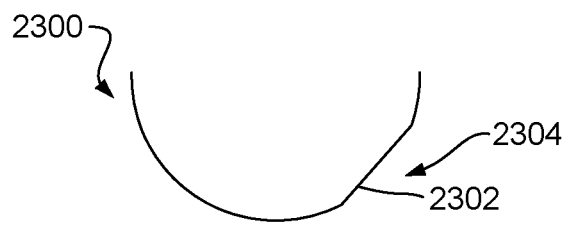
FIG. 23 depicts an example of a distal end with an angled flat in accordance with the disclosure.
Figure 24:
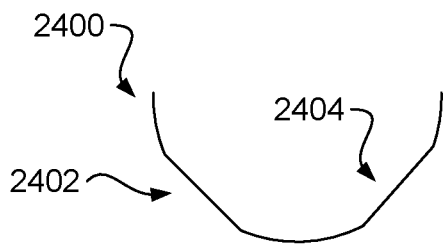
FIG. 24 depicts an example of a distal end with multiple angled flats in accordance with the disclosure.

The distal end 2100 of FIG. 21 includes a centralized flat. The distal end 2200 of FIG. 22 includes an angled flat 2202 on a first side 2204, and the distal end 2300 of FIG. 23 includes an angled flat 2202 on a second side 2300. The distal end 2400 of FIG. 24 includes a first flat 2402 and a second flat 2404 positioned on the sides of the distal end 2400.

Figure 25:
FIG. 25 depicts an example of a rounded distal end in accordance with the disclosure.
Figure 26:
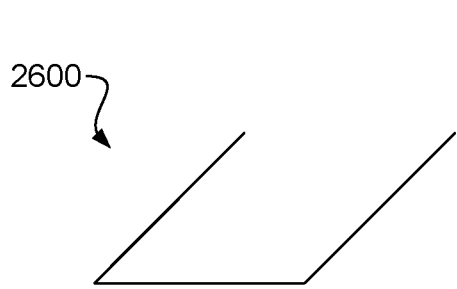
FIG. 26 depicts an example of a flat distal end in accordance with the disclosure.
Figure 27:
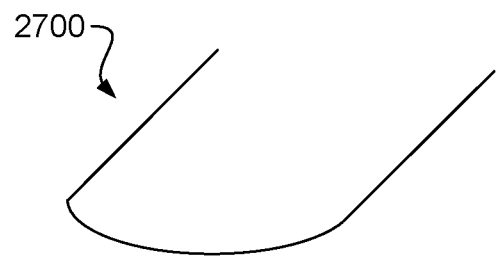
FIG. 27 depicts an example of an angled distal end in accordance with the disclosure.

FIG. 25 depicts an example of a distal end 2500 with a radius of curvature that gets progressively flatter towards the apex 2502 and that gets progressively shaper as the radius of curvature progresses away from the apex 2502. FIG. 26 depicts an example where the distal end 2600 is angled and is flat, FIG. 27 depicts an example where the distal end 2700 is angled and has a radius of curvature.

Figure 28:
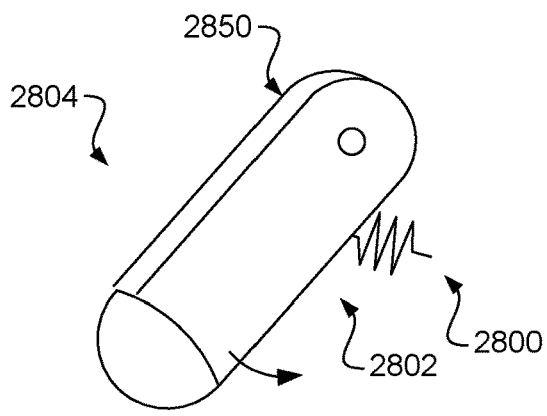
FIG. 28 depicts an example of a pulling biasing mechanism in accordance with the disclosure.
Figure 29:
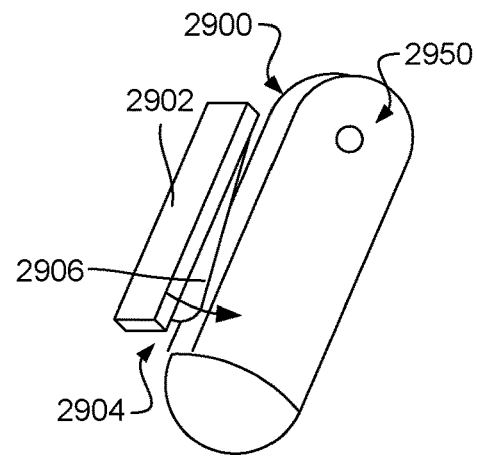
FIG. 29 depicts an example of a pushing biasing mechanism in accordance with the disclosure.

FIGS. 28-32 depict examples of biasing mechanisms that may cause the leg of the control device to return to an initial position after a force to change the lean angle of the control device is relieved. In the example of FIG. 28, a tension spring 2800 may be attached in an inside surface 2802 of the leg 2804. The tension spring 2800 may apply a pulling force to pull the leg 2804 back to the initial position, FIG. 29 depicts an example of a leg 2900 with a structure 2902 positioned to an outside surface 2904 of the leg 2900. A biasing material 2906, such as an elastomeric material, may be attached to the structure 2902. The biasing material 2906 may apply a pressure that urges the leg 2900 to return to the initial position if the leg 2900 moves outward. The outside surface 2904 of the leg 2900 may be in constant contact with the biasing material 2906. Alternatively, in other examples, the outside surface 2904 of the leg 2900 may just come into contact with the biasing material when the leg is moved outwardly.

In the examples of FIGS. 28 and 29, the legs 2804, 2900 include pivot joints 2850, 2950 about which the legs can rotate inward or outward. In examples with these types of pivot joints, the distance between the pivot joints 2850, 2950 and the ends of their respective legs are fixed. The fixed distance between the distal ends and the pivot joints may simplify the calculations used to determine the lean angle as the distance moved by the distal end may represent a single change in the leg's angle.

Figure 30:
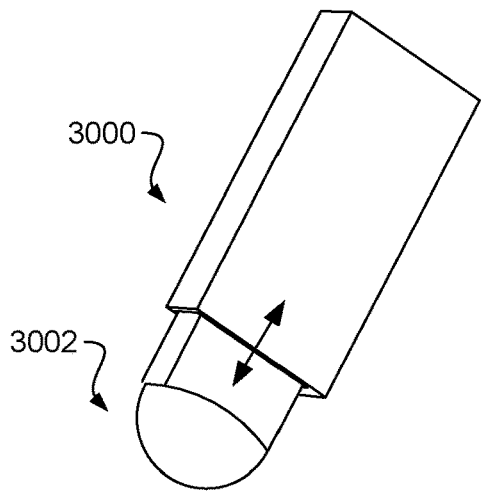
FIG. 30 depicts an example of an extendable leg biasing mechanism in accordance with the disclosure.

In the example of FIG. 30, the leg 3000 may be rigidly attached to the body of the control device. However, in this example, the leg's distal end 3002 may still move with respect to the other legs where the control device is forced into a different lean angle. In the example of FIG. 30, the length of the leg 3000 may change as the control device is oriented into a new lean angle. In this example, the distances between the distal ends may remain in the same respective distances from each other and the new lean angles are measured by the length of the leg. For example, a pressure sensor, a displacement sensor, an optical sensor, a magnetic sensor, another type of sensor, or combinations thereof may be used to determine the length of the legs to determine the lean angle.

In some examples when the length of the legs changes when the lean angle changes, the distal end of the legs may still move with respect to each other. In this case, a combination of measuring the distance traveled by the distal ends and measuring the change in the length of the legs may be used to determine the new lean angle:

In some examples, an internal biasing mechanism may be included in the leg 3000 that returns the leg 3000 to an initial length when the forces moving the control device into the new lean angle are removed.

Figure 31:
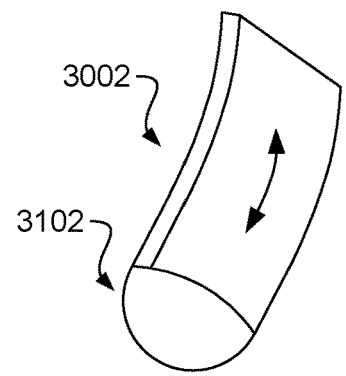
FIG. 31 depicts an example of a flexing biasing mechanism in accordance with the disclosure.

In the example of FIG. 31, the leg 3100 may be rigidly fixed to the body of the control device, but the leg 3100 may be made of a material that has a flexibility to allow the leg to bend when the control device is moved into a new lean angle. The resilience of the flexible material may cause the leg to move back into a straighten orientation when the forces moving the control device into the lean angle are removed. In this example, the distance between the body of the control device and the distal ends 3102 of the legs 3100 may remain relatively fixed, but the distal ends 3102 of the legs 3100 may move with respect to each other. The detected changes in the distance of the distal ends 3102 may be used to determine the new lean angle.

Figure 32:
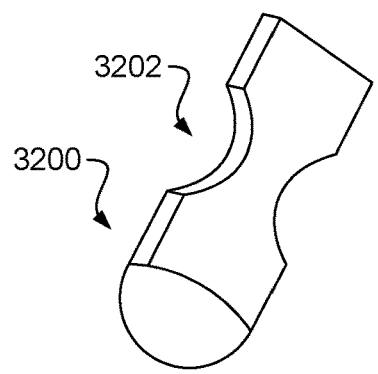
FIG. 32 depicts an example of a flexing biasing mechanism in accordance with the disclosure.

FIG. 32 also includes an example where the legs 3200 may flex when the control device is oriented into a new lean angle. In this depicted example, the leg 3200 may include a recess 3202 that enhances the leg's ability to flex.

Figure 33:
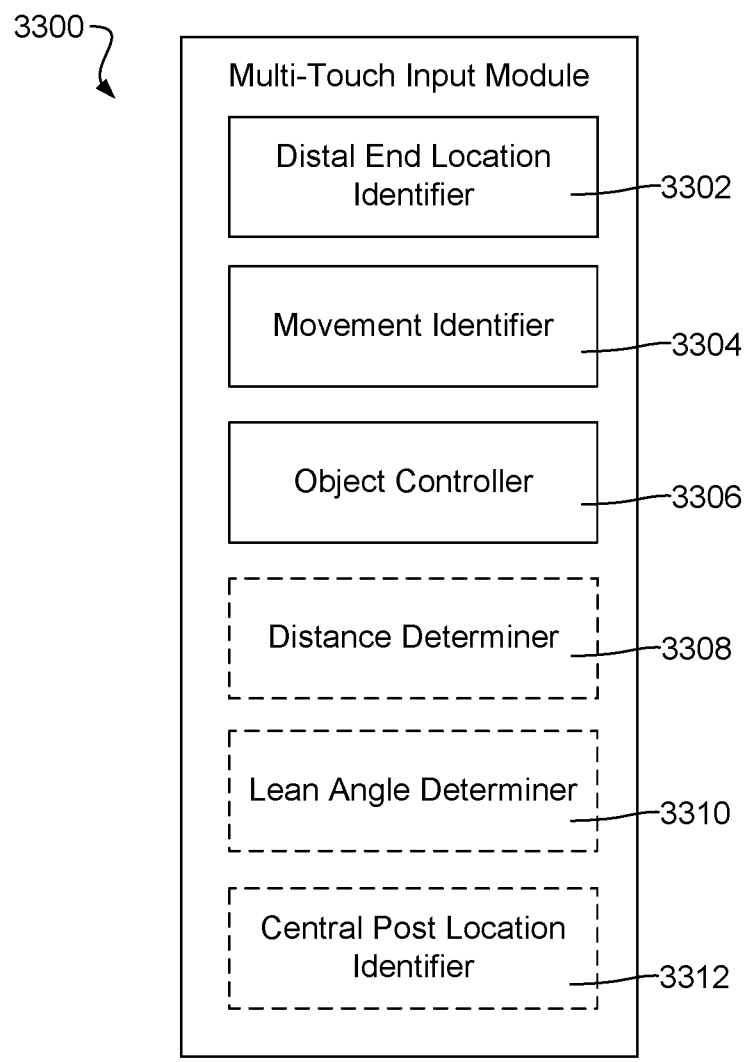
FIG. 33 depicts an example of a module for an input system in accordance with the disclosure.

FIG. 33 depicts an example of a multi-touch input module 3300. In this example, the multi-touch input module 3300 includes programmed instructions in memory and may include associated firmware, logic, processing resources, memory resources, power sources, processing resources, hardware, or other types of hardware to carry out the tasks of the multi-touch input module 3300. In this example, the multi-touch input module 3300 includes a distal end location identifier 3302, a movement identifier 3304, and an object controller 3306. In some examples, the multi-touch input module 3300 may also optionally include a distance determiner 3308, a lean angle determiner 3310, a central post location identifier 3312, or combinations thereof.

The distal end location identifier 3302 may identify the locations of the distal ends. The capacitance input surface may detect the present of the electrically conductive contact surfaces to determine the location of the distal ends.

The movement identifier 3304 may identify when the distal ends are moving. This movement may be tracked by tracking their movement with the capacitance input surface.

The object controller 3306 may control an object based on the inputs from the inputs from the distal end location identifier 3302 and the movement identifier 3304. The object may be a tangible real-world object, such as a remote control vehicle, a drone, a car, a boat, a flying object, another type of remote controlled object, or combinations thereof. In other examples, the object is a computer-generated object, such as an object in a three-dimensional modeling program, a two-dimensional program, a gamming application, a word processing application, another type of computing program application, or combinations thereof. The inputs of the movement for the distal ends may be used to control the movement of the object. For example, if the distal ends each move in a forward direction, the object may be moved in a forward direction. In those situations where the distal ends are collectively moved in along a path, the object may be moved along a similar path. In another example, when the distal ends are collectively rotated about a central area, the object may be rotated about a similar axis.

The distance determiner 3308 may be used to determine the distance between the distal ends. When the distal ends move together so that the distances between the distal ends remains the same, the orientation of the control device may be interpreted to have remained the same.

The lean angle determiner 3310 may be used to determine a lean angle of the control device. In cases where the distance determiner 3308 determines that at least one of the distal ends moves a greater distance than one of the other distal ends, the lean angle determiner 3310 may determine that the control device has a new lean angle. The lean angle determiner 3310 may communicate the new lean angle to the object controller 3306. In response, the object controller 3306 may orient the object to reflect the new lean angle of the control device.

The central post location determiner 3312 may determine the presence of the post. In some cases, the detection of the post may trigger the multi-touch input module to interpret at least some of the commands in a different mode.

Figure 34:
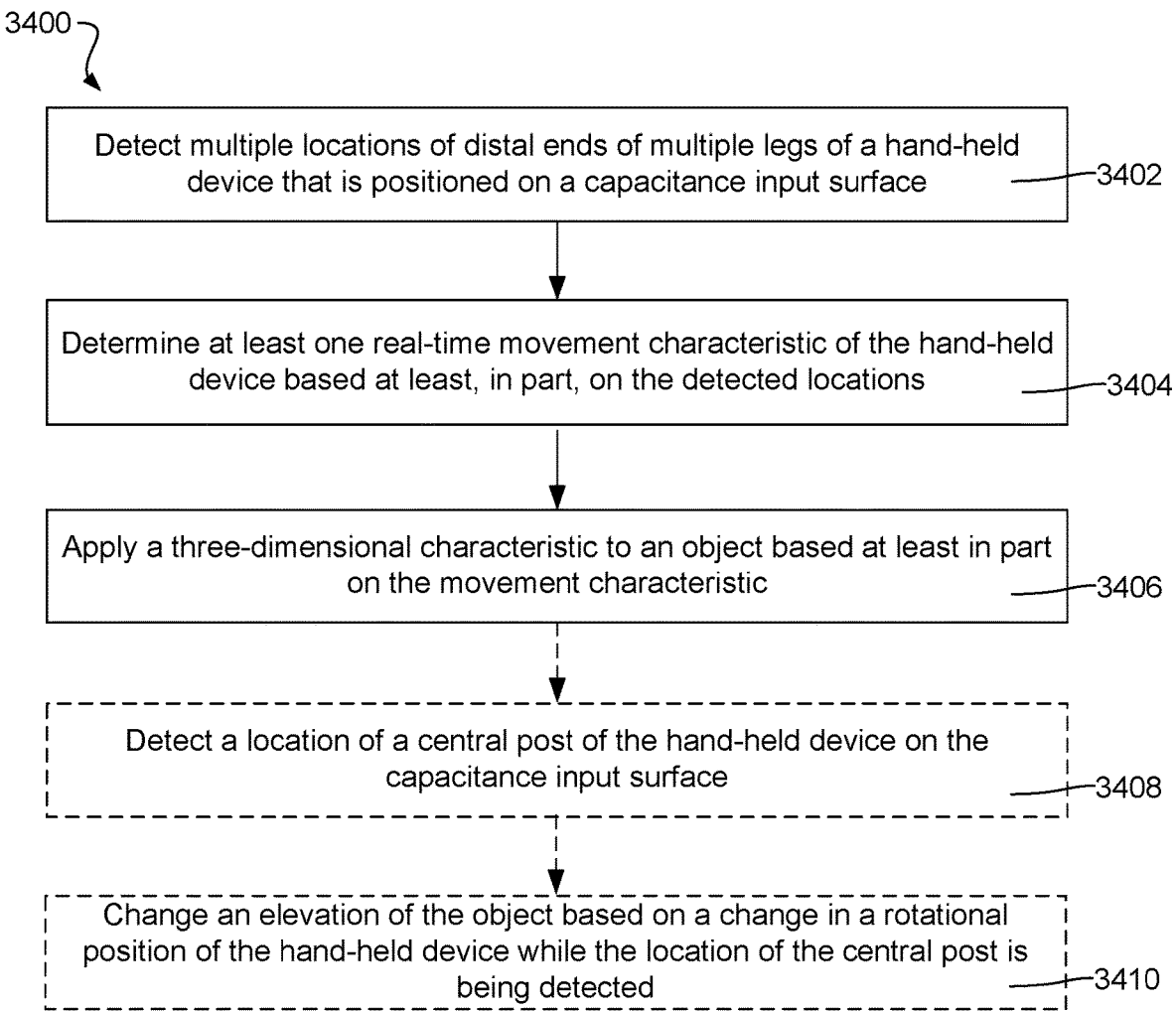
FIG. 34 depicts an example of a method of using an input system in accordance with the disclosure.
Figure 35:
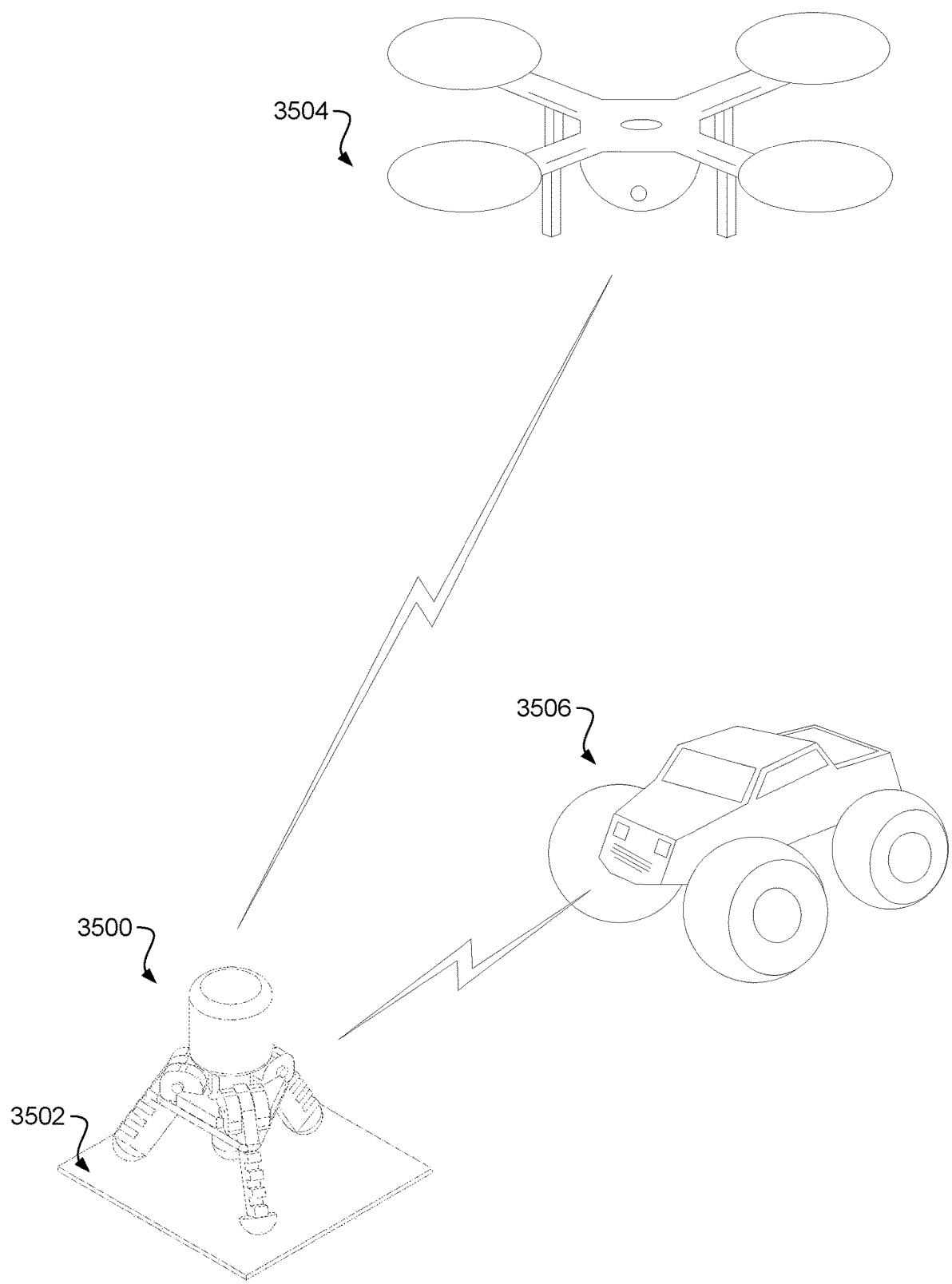
FIG. 35 depicts an example of an input system controlling a remote tangible object in accordance with the disclosure.

FIG. 34 depicts an example of a method 3400 of a multi-touch input system. This method 3400 may be performed based on the description of the devices, modules, and principles described in relation to FIGS. 1-34.1n this example, the method 3400 includes detecting 3402 multiple locations of distal ends of multiple legs of a control device that is positioned on a capacitance input surface, determining 3404 at least one real-time movement characteristic of the control device based at least, in part, on the detected locations, and applying 3406 a three-dimensional characteristic to an object based at least in part on the movement characteristic. Optionally, the method 3400 may include detecting 3408 a location of a central post of the control device on the capacitance input surface. Optionally, the method 3400 may include changing 3410 an elevation of the object based on a change in a rotational position of the control device while the location of the central post is being detected FIG. 35 depicts an example of a control device 3500 and a capacitance input surface 3502 being used to control a drone 3504 and/or a remote controlled car 3506. The multi-touch input system may be used to control the three-dimensional parameters of the remote controlled objects. A non-exhaustive list of three-dimensional parameters that may be controlled with the multi-touch input system may include, but is not limited to, elevation, pitch, speed, acceleration, turning radius, orientation, direction, lean angle, another three-dimensional parameter, or combinations thereof.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A multi-touch input system, comprising:
a control device having a body;
multiple legs connected to the body, where each of the multiple legs extends from the body at an angle; and
each of the multiple legs having a distal end and each of the distal ends having an electrically conductive contact surface;
wherein each of the electrically conductive contact surfaces are independently movable with respect to each other;
wherein when the control device is supported on a surface by the multiple legs and when a lean angle of the control device changes, the distal ends of the multiple legs are configured to remain in contact with the surface.

2. The system of claim 1, wherein each of the multiple legs are movably connected to an outside perimeter of the body.

3. The system of claim 1, wherein each of the multiple legs are equidistantly positioned around an outside perimeter of the body.

4. The system of claim 1, wherein at least one of the electrically conductive contact surfaces has a rounded shape.

5. The system of claim 4, wherein the rounded shape is a spheric section.

6. The system of claim 1, further including:
a handle attached to a side of the body, where the side is opposite of the distal ends of the legs;
wherein the handle includes an electrically conductive surface that is in electrical communication with each of the electrically conductive contact surfaces.

7. The system of claim 1, wherein the multiple legs include at least three legs.

8. The system of claim 1, wherein the body further includes a post extending away from an underside of the body and extending between the multiple legs.

9. The system of claim 8, wherein the post includes a post distal end, and the post distal end includes a post electrically conductive contact surface.

10. The system of claim 8, wherein the post electrically conductive contact surface has a rounded shape.

11. The system of claim 8, wherein each of the multiple legs has a length measured from the body to the distal ends when the distal ends are in contact with a surface respectively;
the post includes a length measured from the body to the post distal end;
wherein the length of the post when extended to contact the surface is less than each of the lengths of each of the multiple legs.

12. The system of claim 11, wherein when the control device is pushed downward against the surface such that the post distal end contacts the surface on which the distal ends of the multiple legs contacts, at least one of the multiple legs changes an angle formed with respect to the body.

13. The system of claim 12, further including a biasing mechanism to return the at least one leg to a former angle formed between the at least one leg and the body.

14. A multi-touch input system, comprising:
a control device having a body;
multiple legs connected to the body;
each of the multiple legs having a distal end and each of the distal ends having an electrically conductive contact surface;
wherein each of the electrically conductive contact surfaces are movable with respect to each other;
a capacitance input surface;
a processor in communication with the capacitance input surface;
memory having programmed instructions configured to cause the processor, when executed, to:
detect locations of each of the distal ends when the control device is positioned on the capacitance input surface;
determine a real-time lean angle of the control device based at least, in part, on the detected locations; and apply the lean angle on a computer generated object in a display.

15. The system of claim 14, further comprising:
a biasing mechanism configured to cause the legs of the control device to return to an initial position after a force to change the lean angle of the control device is relieved.

16. The system of claim 14, wherein the post includes a post distal end;
wherein when the control device is pushed downward against the capacitance input surface such that the post distal end contacts the capacitance input surface at least one of the multiple legs changes an angle formed with respect to the body.

17. The system of claim 14, wherein the programmed instructions are further configured to cause the processor, when executed, to detect the location of the post distal end when the post distal end is in contact with the capacitance input surface.

18. A multi-touch input system, comprising:
a control device having a body;
at least three legs connected to the body; and
each of the at least three legs having a distal end and each of the distal ends having an electrically conductive contact surface;
a post extending away from an underside of the body and extending between the multiple legs;
wherein each of the electrically conductive contact surfaces are independently movable with respect to the posts;
wherein when the control device is supported on a surface by the at least three legs and when a lean angle of the control device changes, the distal ends of the at least three legs are configured to remain in contact with the surface.

19. The system of claim 18, wherein the post includes a post distal end;
wherein the post distal end includes an electrically conductive contact surface.

20. The system of claim 19, wherein each of the multiple legs has a length measured from the body to the distal ends respectively when each of the multiple legs is in contact with a surface;
the post includes a length measured from the body to the post distal end; and
the post distal end includes a pivot surface;
wherein the length of the post is less than each of the lengths of each of the multiple legs when the post is extended to contact the surface;
wherein the electrically conductive contact surfaces of the at least three legs are configured to slide with respect to the post distal end when the control device is pivoting on the pivot surface of the post distal end.

* * * * *